(12) United States Patent
Mukai et al.

(10) Patent No.: US 8,433,477 B2
(45) Date of Patent: Apr. 30, 2013

(54) STEERING CONTROL APPARATUS

(75) Inventors: Yasuhiko Mukai, Anjo (JP); Hideki Kabune, Nagoya (JP); Kouichi Nakamura, Toyota (JP); Masashi Hori, Anjo (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 131 days.

(21) Appl. No.: 13/136,560

(22) Filed: Aug. 4, 2011

(65) Prior Publication Data

US 2012/0035810 A1  Feb. 9, 2012

(30) Foreign Application Priority Data

Aug. 6, 2010  (JP) ................................. 2010-177635

(51) Int. Cl.
*A01B 69/00* (2006.01)

(52) U.S. Cl.
USPC .......................................................... 701/41

(58) Field of Classification Search ........ 701/41
See application file for complete search history.

(56) References Cited

U.S. PATENT DOCUMENTS

2008/0040001 A1* 2/2008 Ogawa et al. .................. 701/41
2008/0097670 A1* 4/2008 Ogawa et al. .................. 701/42
2009/0075775 A1* 3/2009 Tozaki et al. ................. 475/185
2011/0011666 A1   1/2011 Hori et al.

FOREIGN PATENT DOCUMENTS

| JP | 2001-287660 | 10/2001 |
| JP | 2004-58743  | 2/2004  |
| JP | 2004-114857 | 4/2004  |
| JP | 2005-350036 | 12/2005 |
| JP | 2011-020489 | 2/2011  |

* cited by examiner

*Primary Examiner* — James Trammell
*Assistant Examiner* — Michael D Lang
(74) *Attorney, Agent, or Firm* — Harness, Dickey & Pierce, PLC

(57) ABSTRACT

In a steering control apparatus, a worm gear is configured to have a lead angle for a self-lock operation, by which a worm wheel is allowed to rotate by rotation of a worm but the worm is not allowed to rotate by rotation of the worm wheel. Thus, a lock mechanism need not be provided separately from a gear mechanism and the apparatus is reduced in entire size. A VGRS control part checks whether the worm gear has a self-lock failure, which disables the self-lock operation. If the worm gear has the self-lock failure, idling suppression processing is performed to suppress idling of a steering wheel. Thus, even when the self-lock failure arises, the steering wheel is suppressed from idling.

11 Claims, 21 Drawing Sheets

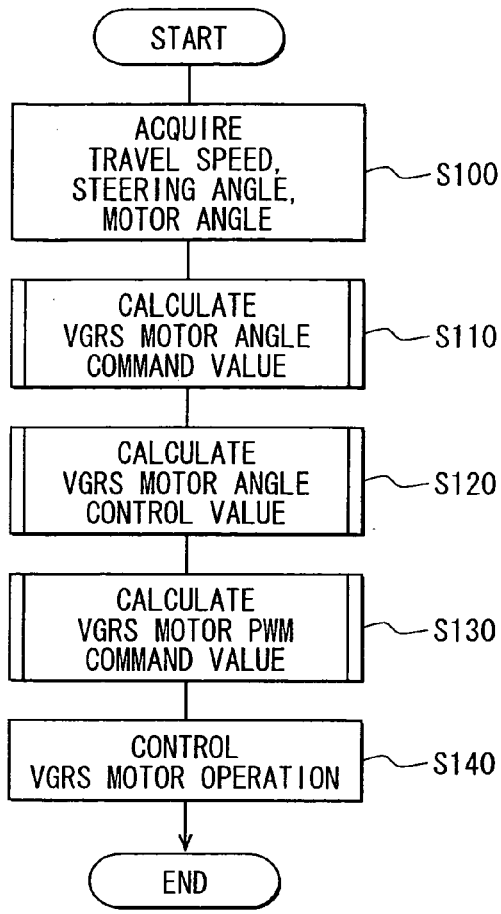
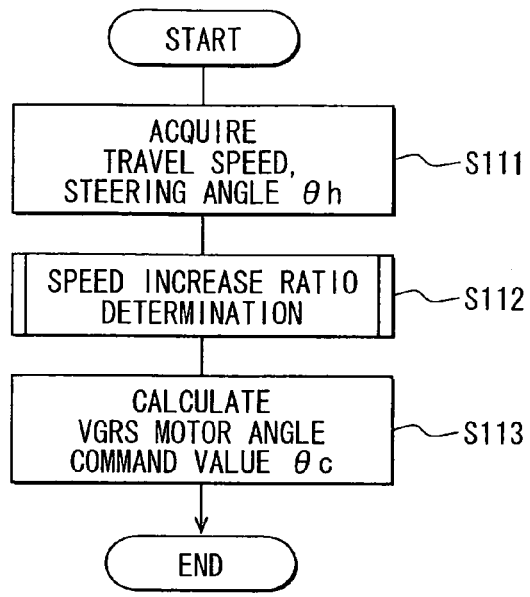
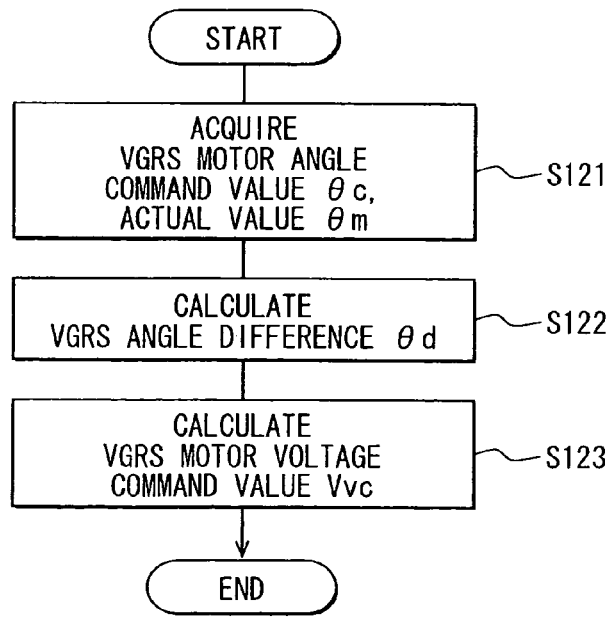

STEERING CONTROL APPARATUS

CROSS REFERENCE TO RELATED APPLICATION

This application is based on and incorporates herein by reference Japanese patent application No. 2010-177635 filed on Aug. 6, 2010.

FIELD OF THE INVENTION

The present invention relates to a steering control apparatus, which controls steering operation of a steering wheel of a vehicle.

BACKGROUND OF THE INVENTION

A conventional variable gear ratio steering (VGRS) apparatus varies steered angle of steered wheels (vehicle wheels) of a vehicle relative to steering angle of a steering wheel. The VGRS apparatus (for example, refer to patent documents 1 to 4) conventionally has a lock mechanism for fixing a steering ratio. The lock mechanism includes a lock pin and a latch member for latching the lock pin.
(Patent document 1) JP 2001-287660A
(Patent document 2) JP 2004-058743A
(Patent document 3) JP 2004-114857A
(Patent document 4) JP 2005-350036A However, according to the patent documents 1 to 4, the lock mechanism for fixing the steering ratio is provided separately from a gear mechanism, which varies the steering ratio. The apparatus therefore necessarily becomes large in overall size.

SUMMARY OF THE INVENTION

It is an object of the present invention to provide a steering control apparatus, overall size of which can be reduced.

According to the present invention, a steering control apparatus comprises, an input shaft coupled to a steering device operated by a driver of a vehicle, an output shaft provided rotatably to the input shaft and forming a torque transfer path to transfer torque applied to the steering device to vehicle wheels, a differential gear including an input gear rotatable with the input shaft, an output gear rotatable with the output shaft, and a pinion gear meshed with the input gear and the output gear, a support member provided to support the pinion gear rotatably, a worm gear including a worm wheel rotatable with the support member and a worm meshed with the worm wheel, a motor provided to drive the worm to rotate, and an electronic control unit provided to control driving of the motor based on a steering angle of the steering device. The worm gear has a lead angle for providing a self-lock function, by which the worm wheel is enabled to rotate by rotation of the worm and the worm is disabled to rotate by rotation of the worm wheel. The electronic control unit checks whether the worm gear has a self-lock failure, which disables self-lock operation in the worm gear, and suppresses the steering device from idling when the self-lock failure is determined.

BRIEF DESCRIPTION OF THE DRAWINGS

The foregoing and other objects, features and advantages of the present invention will become more apparent from the following detailed description made with reference to the accompanying drawings. In the drawings:

FIG. 11 is a flowchart showing control calculation processing executed in the first embodiment;

FIG. 12 is a flowchart showing VGRS motor rotation angle command value calculation processing executed in the first embodiment;

FIG. 13 is a flowchart showing VGRS motor rotation angle control calculation processing executed in the first embodiment;

DETAILED DESCRIPTION OF THE EMBODIMENT

First Embodiment

A steering control apparatus according to a first embodiment of the present invention will be described with reference to FIG. 1 to FIG. 23. General structure of a steering system 100 will be described first with reference to FIG. 1.

Figure 1:
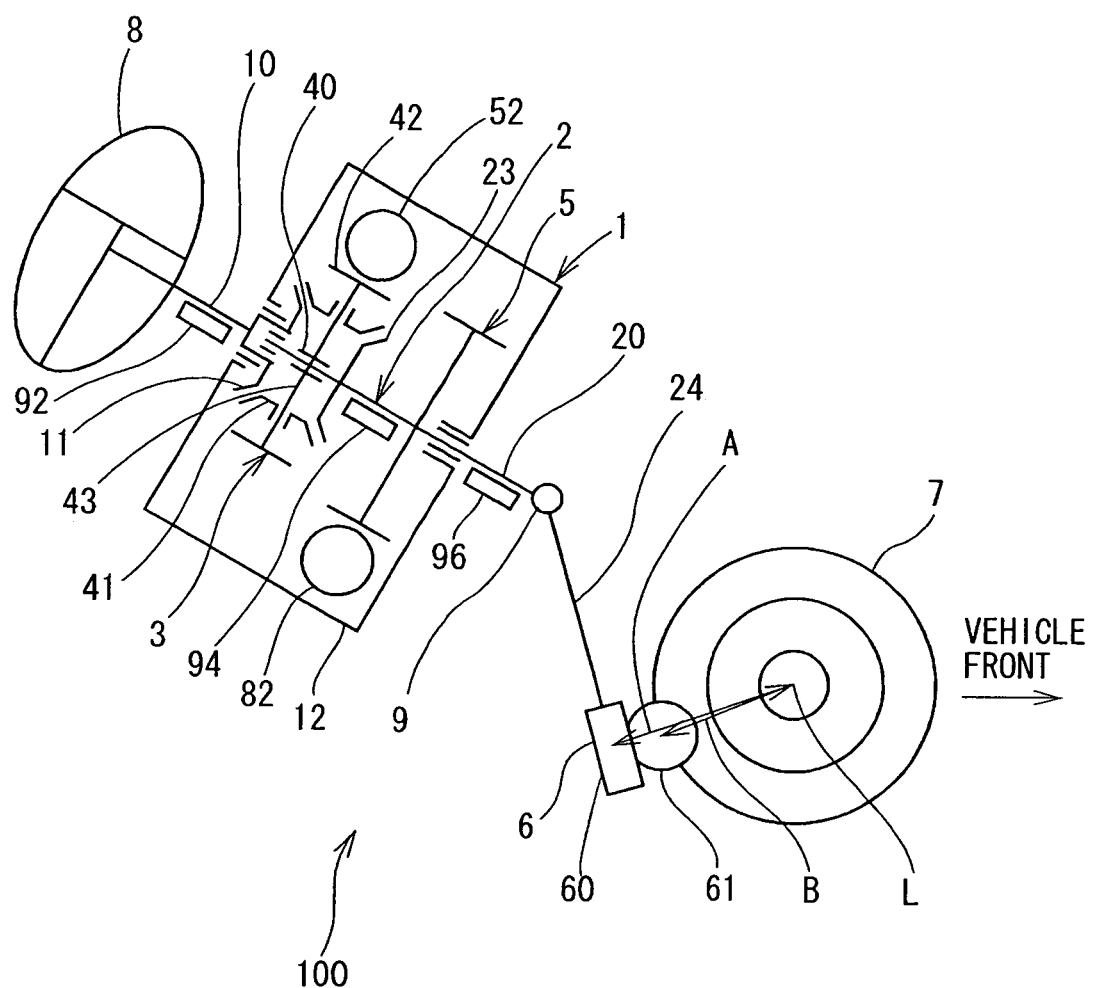
FIG. 1 is a schematic view showing entire structure of a steering control apparatus according to a first embodiment of the present invention.
Figure 2:
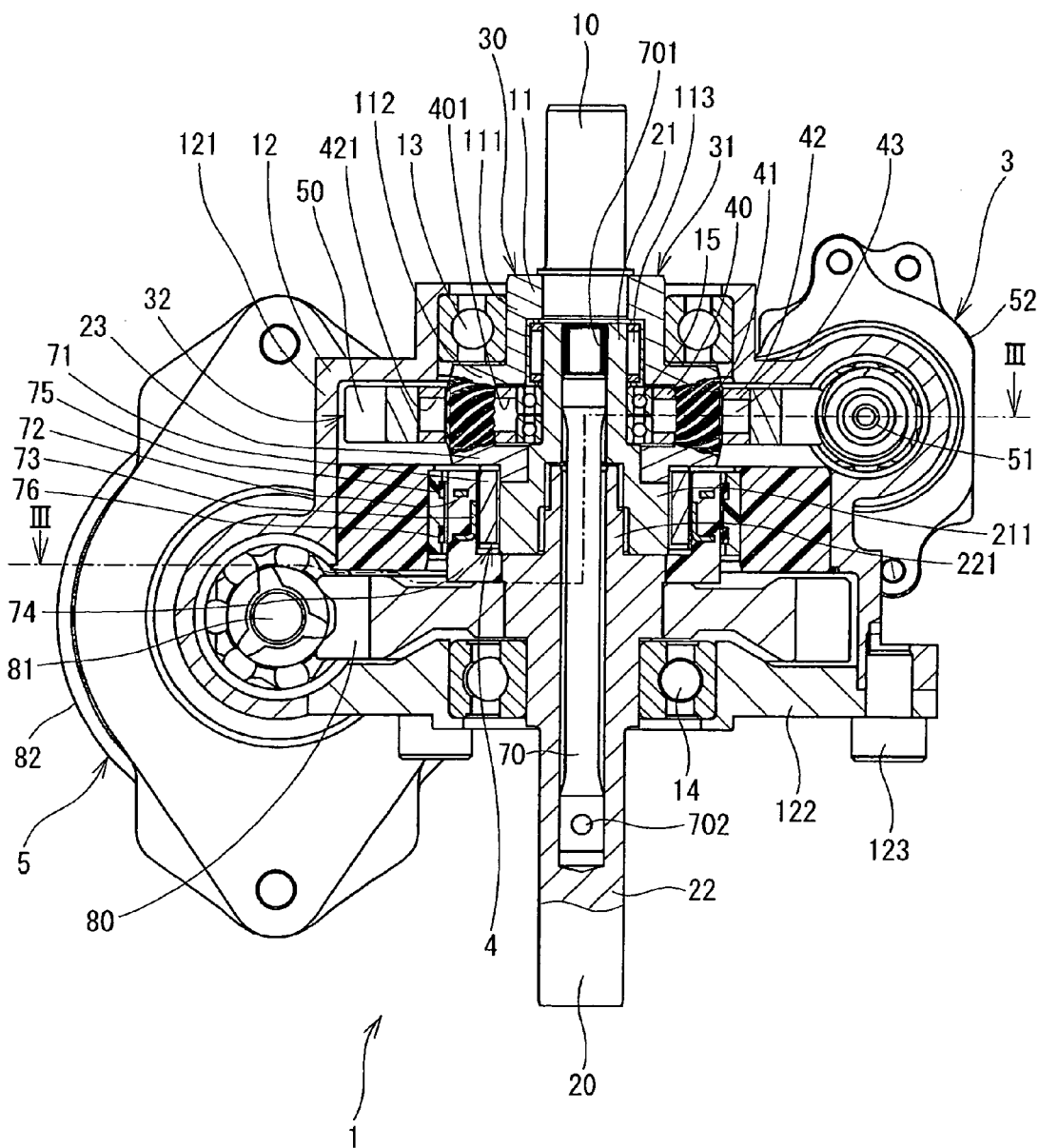
FIG. 2 is a sectional view of the steering control apparatus according to the first embodiment.

As shown in FIG. 1, the steering system 100 includes a steering control apparatus 1, a column shaft 2, a rack-and-pinion mechanism 6, vehicle wheels (steered front vehicle tire wheels) 7, a steering wheel 8 as a steering device, and the like. The column shaft 2 and the rack-and-pinion mechanism 6 form a torque transfer path.

The steering control apparatus 1 includes a variable gear ratio steering device 3, an electric power steering device 5 and the like. The variable gear ratio steering device 3 varies a ratio between a rotation angle of an input shaft 10 and a rotation angle of an output shaft 20. The electric power steering device 5 is a power steering device, which generates assist torque for assisting steering operation of the steering wheel 8 by a driver. The variable gear ratio steering device 3 and the electric power steering device 5 are referred to as a VGRS device and an EPS device, respectively. The VGRS device 3 and the EPS device 5 are provided about the column shaft 2 and accommodated within a housing 12. The VGRS device 3 and the EPS device 5 are thus integrated into a single module. The steering control apparatus 1 will be described in detail later with reference to FIG. 2 and so on.

In the steering control apparatus 1, the column shaft 2 includes the input shaft 10, the output shaft 20. The output shaft 20 is coupled to a universal joint 9 and a shaft 24. The input shaft 10 is coupled to the steering wheel 8, which is steered by a driver. A steering wheel angle sensor 92 is provided on the input shaft 10 to detect a steering angle, which indicates an angle of steering of the steering wheel 8. Since the steering wheel 8 and the input shaft 10 are coupled to each other, the steering angle of the steering wheel 8 equals the rotation angle of the input shaft 10. The steering angle of the steering wheel 8 is referred to as a steering angle θh.

The output shaft 20 is provided coaxially with the input shaft 10 and relatively rotatable to the input shaft 10. The input shaft 10 and the output shaft 20 are rotated in opposite directions due to operation of a differential gear 31 of the VGRS device 3. The output shaft 20 transfers steering torque, which is generated by steering operation of the steering wheel 8 by the driver, to the vehicle wheels 7 through the universal joint 9, the shaft 24 and the rack-and-pinion mechanism 6. A pinion angle sensor 96 is provided on the output shaft 20 to detect a pinion angle. The rotation angle of the output shaft 20 is referred to as a pinion angle θp.

The rack-and-pinion mechanism 6 includes a steering pinion 60, a steering rack bar 61 and the like. The rack-and-pinion mechanism 6 is positioned at a rear side of a vehicle relative to a straight line (indicated by L in FIG. 1), which connects centers of rotation of the vehicle wheels 7, which are provided at a left side and a right side of the vehicle. The steering pinion 60 is a disk-shaped gear and provided at an axial end, which is opposite to the steering wheel 8. The steering pinion 60 is rotatable in both forward and reverse directions with the shaft 24. A steering rack bar 61 is provided movably in both left and right directions of the vehicle. As rack teeth provided on the steering rack bar 61 are meshed with the steering pinion 60, rotary motion of the steering pinion 60 is changed into linear motion of the steering rack bar 61 in left and right directions of the vehicle. That is, the rack-and-pinion mechanism 6 changes the rotary motion of the column shaft 2 to the linear motion.

Although not shown, tie rods and knuckle arms are provided at both ends of the steering rack bar 61 so that the steering rack bar 61 is coupled to the vehicle wheels 7 through the tie rods and the knuckle arms. Thus the vehicle wheels 7 at left and right sides are steered in correspondence to an amount of movement of the steering rack bar 61.

A distance between the steering pinion 60 and the straight line L connecting the centers of rotation of the vehicle wheels 7 is longer than a distance B between the steering rack bar 61 and the line L connecting the centers of rotation of the vehicle wheels 7. The output shaft 20 rotates in a direction opposite to that of the input shaft 10 because of operation of the differential gear 31 provided between the input shaft 10 and the output shaft 20. For this reason, when the steering wheel 8 is steered in the counter-clockwise direction (left direction), the steering pinion 60 rotates in the clockwise direction when viewed from the side of the universal joint 9. The steering rack bar 61 moves in the right direction and the steered angle of the vehicle wheels 7 is varied so that the vehicle turns in the left direction. When the steering wheel 8 is steered in the clockwise direction (right direction), the steering pinion 60 rotates in the counter-clockwise direction when viewed from the side of the universal joint 9. The steering rack bar 61 moves in the left direction and the steered angle of the vehicle wheels 7 is varied so that the vehicle turns in the right direction.

By thus setting the distance A between the steering pinion 60 and the straight line L connecting the centers of rotation of the vehicle wheels 7 to be longer than the distance B between the steering rack bar 61 and the straight line L connecting the centers of rotation of the vehicle wheels 7, that is, A>B, the vehicle wheels 7 are steered in the direction opposite to the direction of rotation of the output shaft 20, the shaft 24 and the steering pinion 60. The direction of rotation of the steering wheel 8 and the direction of steered angle of the vehicle wheels 7 are matched. Thus, it is not necessary to provide a gear device and the like, which reverses the direction of rotation of the output shaft 20 again.

As described above and shown in FIG. 2 and FIG. 3, the steering control apparatus 1 includes the housing 12, the input shaft 10, the output shaft 20, the VGRS device 3, the EPS device 5 and the like. The housing 12 is formed of a housing body 121 and an end frame 122. The housing body 121 and the end frame 122 are fixed to each other by screws 123. A gear mechanism 30 is accommodated within the housing 12. The input shaft 10 and the output shaft 20 are passed through the housing 12. A first bearing device 13 is provided in the housing body 121 at a side, which is opposite to the end frame 122. A second bearing device 14 is provided in the end frame 122 to rotatably support a second output shaft 22, which will be described later.

The output shaft 20 is formed of a first output shaft 21 and a second output shaft 22. The first output shaft 21 and the second output shaft 22 are formed in a hollow pipe shape. A torsion bar 70 is passed through the inside of the hollow pipe. The first output shaft 21 is provided closer to the input shaft 10 than the second output shaft 22 is. The first output shaft 21 has an enlarged part 211 having a large inner diameter at a side opposite to the input shaft 10. The second output shaft 22 has a reduced part 221 at a side of the first output shaft 21. The reduced part 221 is smaller in outer diameter than an inner diameter of the enlarged part 211. The reduced part 221 of the second output shaft 22 is inserted into the enlarged part 211 of the first output shaft 21.

The torsion bar 70 is passed through a space formed in a radially inside part of the first output shaft 21 and the second output shaft 22. Serration 701 is formed on the torsion bar 70 at an axial end of the torsion bar 70 at a side of the input shaft 10. The serration 701 is tightly fit with serration formed on a radially inside face of the first output shaft 21. The end of the torsion bar 70, which is opposite to the input shaft 10, is coupled to the output shaft 22 by a pin 702. Thus, the first output shaft 21 and the second output shaft 22 are thus coupled to be relatively rotatable by the torsion bar 70. When torsion torque is applied to the torsion bar 70 because of relative rotation between the first output shaft 21 and the second output shaft 22, twist of predetermined resiliency generated about the shaft is generated. As a result, the torque applied between the first output shaft 21 and the second output shaft 22. Twist displacement of the torsion bar 70 is detected by a steering torque detection device 4.

The steering torque detection device 4 detects steering torque, which is generated by operating the steering wheel 8, by detecting twist displacement of the torsion bar 70. The steering torque detection device 4 includes multiple-pole magnets 71, a set of steering torque magnetic yoke 72, 73, a set of magnetic flux collecting rings 75, 76 and a torque sensor 94 (shown in FIG. 1, FIG. 8, etc.). The steering torque detection device 4 is provided with a slight gap in the axial direction relative to an output gear 23, which will be described later.

The multiple-pole magnets 71 are formed in an annular ring shape and press-fitted with the first output shaft 21. Thus, the multiple-pole magnets 71 rotate with the first output shaft 21. The multiple-pole magnets 71 are positioned at a side more opposite to the input shaft 10 in the axial direction than an output gear 23 press-fitted with the first output shaft 21. The multiple-pole magnets 71 are magnetized with N-pole and S-pole alternately in the circumferential direction.

The set of magnetic yokes 72 and 73 are provided radially outside of the multiple-pole magnets 71 and in magnetic field formed by the multiple-pole magnets 71. The magnetic yokes 72 and 73 have nails, which extend in the axial direction from a set of annular ring parts facing in the axial direction, respectively. The nails of the yokes 72 and 73 are interleaved alternately by shifting in the circumferential direction. The magnetic yokes 72 and 73 are molded integrally with a resin mold 74. The resin mold 74 is press-fitted on the radially outside part of the second output shaft 22 through a collar, which is not shown. Thus, the magnetic yokes 72 and 73 rotate with the second output shaft 22.

The set of magnetic flux collecting rings 75 and 76 are formed in an annular shape and provided radially outside the resin mold 74, which molds the magnetic yokes 72 and 73, in a manner to be relatively rotatable against the resin mold 74. One magnetic flux collecting ring 75 is positioned to correspond to one yoke 72 in the axial direction. The other magnetic flux collecting ring 76 is positioned to correspond to the other magnetic yoke 73 in the axial direction. Although not shown, an air gap is provided between the magnetic flux collecting ring 75 and the magnetic flux collecting ring 76. The torque sensor 94 is positioned in the air gap to detect magnetic flux density in the air gap.

A method of detecting steering torque by the torque sensor 94 will be described next. When no steering torque is applied to the output shaft 20, no twist displacement is generated in the torsion bar 70. In this instance, a center of each nail of the magnetic yokes 72 and 73 and a boundary line between the N-pole and the S-pole of the magnet 71 are in alignment. The same number of magnetic lines come in the nails of the magnetic yokes 72 and 73 from the N-pole of the magnet 71 and go out from the magnetic yokes 72 and 73 to the S-pole of the magnet 71. The magnetic lines inside the magnetic yoke 72 are closed, and the magnetic lines inside the magnetic yoke 73 are closed. No magnetic flux thus leaks in the air gap formed between the magnetic flux collecting rings 75 and 76. As a result, the magnetic density detected by the torque sensor 94 is zero.

When steering torque is applied to the output shaft 20 on the other hand, twist displacement is generated in the torsion bar 70. In this instance, the relative position between the multiple-pole magnets 71 and the magnetic yoke 72 and 73 is changed in the circumferential direction. The center of each nail of the magnetic yokes 72 and 73 and the boundary line between the N-pole and the S-pole of the magnet 71 are not in alignment any more. Magnetic lines having polarities of the N-pole and the S-pole increase in the magnetic yokes 72 and 73, respectively. Magnetic flux thus leaks in the air gap formed between the magnetic flux collecting rings 75 and 76. As a result, the magnetic density detected by the torque sensor 94 is not zero any more. The magnetic density detected by the torque sensor 94 is generally proportional to the twist displacement amount of the torsion bar 70, and polarity of the detected magnetic density reverses in correspondence to the direction of twisting. Thus, the twist displacement of the torsion bar 70 is detected. As described above, the torque generated between the first output shaft 21 and the second output shaft 22 is converted into twist displacement of the torsion bar 70. The steering torque detection device 4 thus detects torque generated between the first output shaft 21 and the second output shaft 22 by detecting magnetic density generated in the air gap.

The VGRS device 3 includes the gear mechanism 30 and a VGRS motor 52, which is provided as a motor for driving the gear mechanism 30. The gear mechanism 30 is formed of the differential gear 31 and the worm gear 32. The differential gear 31 includes an input gear 11, an output gear 23 and a pinion gear 41. The worm gear 32 includes a worm wheel 50 and a worm 51.

The input gear 11 is positioned at a side opposite to the steering wheel 8 of the input shaft 10. The input gear 11 is a bevel wheel, which is made of metal or resin and meshes the pinion gear 41. The input gear 11 includes a cylindrical tube part 111 and a gear part 112, which is formed in a bevel shape and positioned radially outside the tubular part 111. The input shaft 10 is press-inserted into the tubular part 111. The tubular part 111 is supported rotatably relative to the housing body 121 by the first bearing part 13 provided in the housing body 121. The input shaft 10 and the input gear 11 are thus supported rotatably in the housing 12. An axial end part of the first output shaft 21, which is at the side of the input shaft 10, is inserted in the radially inside part of the input gear 11. A needle bearing 113 is provided between the input gear 11 and the first output shaft 21. The first output shaft 21 is thus supported rotatably by the input gear 11. The second output shaft 22 is supported rotatably by the second bearing device 14.

The output gear 23 is provided to face the gear part 112 of the input gear 11 sandwiching the pinion gear 41. The output gear 23 is a bevel gear, which is made of metal or resin and meshes the pinion gear 41. The first output shaft 21 of the output shaft 20 is press-fitted into the output gear 23. The output gear 23 is provided at a position, which is more opposite to the input shaft 10 in the axial direction than the needle bearing 113 is.

A plurality of pinion gears 41 is provided between the input gear 11 and the output gear 23. The pinion gear 41 is a bevel wheel, which meshes the input gear 11 and the output gear 23. Here, relation among the input gear 11, the output gear 23 and the pinion gear 41 will be described. The number of teeth of the pinion gear 41 is even. The numbers of teeth of the input gear 11 and the output gear 23 are the same and odd. As a result, the point of contact between the teeth of the input gear 11 and the pinion gear 41 varies in correspondence to rotation. Similarly, the point of contact between the teeth of the output gear 23 and the pinion gear 41 varies in correspondence to rotation. For this reason, it is less likely that wear of a specified tooth progresses and local wear shortens durability. It is possible to change the number of teeth of the pinion gear to be odd so that the input gear 11 and the output gear 23 have the same number of teeth.

The input gear 11, the output gear 23 and the pinion gear 41 have spiral teeth so that rate of meshing between the input gear 11 and the pinion gear 41 and the rate of meshing between the output gear 23 and the pinion gear 41 are increased. Thus, operation sound generated by abutting of teeth can be reduced and ripple vibration transferred from the steering wheel 8 to a driver can be reduced. In case that the input gear 11 and the output gear 23 are made of metal, the pinion gear 41 is made of resin. In case that the input gear 11 and the output gear 23 are made of resin, the pinion gear 41 is made of metal. Thus, sound of hitting generated when gears mesh can be reduced.

The pinion gear 41 is positioned radially outside of the first output shaft 21 so that its rotation axis perpendicularly crosses the rotation axis of the input shaft 10 and the output shaft 20. The pinion gear 41 is formed an axial hole, through which a pinion gear shaft member 43 is passed. The axial hole formed in the pinion gear 41 is formed to have a diameter, which is slightly larger than an outer diameter of the pinion gear shaft member 43.

A third bearing 15 and an inner ring member 40 are provided between the pinion gear 41 and the first output shaft 21. The third bearing 15 is positioned between the needle bearing 113 and the output gear 23 in the axial direction and between the first output shaft 21 and the inner ring member 40 in the radial direction. The third bearing 15 thus rotatably supports the inner ring member 40 at a position radially outside the first output shaft 21.

The inner ring member 40 is formed first holes 401, which pass in a direction perpendicular to the rotation axis of the first output shaft 21. The first holes 401 are formed equi-angularly in the circumferential direction of the inner ring member 40. One axial end of the pinion gear shaft member 43, which is passed through the pinion gear 41, is press-fitted in the first hole 401.

An outer ring member 42 is provided radiallly outside the inner ring member 40 sandwiching the pinion gear 41. The outer ring member 42 is formed second holes 402, which pass in a direction perpendicular to the rotation axis of the first output shaft 21. The second holes 421 are formed equi-angularly in the circumferential direction of the outer ring member 42. The second holes 421 are formed at positions, which correspond to the first holes 401 of the inner ring member 40. The other axial end of the pinion gear shaft member 43, which is passed through the pinion gear 41, is press-fitted in the second hole 421. The other axial end of the pinion gear shaft member 43 is opposite to the axial end of the same fitted in the first hole 401. That is, the pinion gear 41 is positioned between the inner ring member 40 and the outer ring member 42 to be rotatable about an axis of the pinion gear shaft member 43, which is supported by the inner ring member 40 and the outer ring member 42. According to this configuration, the pinion gear shaft member 43 can be formed and assembled readily. The inner ring member 40, the outer ring member 42 and the pinion gear shaft member 43 form a supporting member.

The worm wheel 50 is made of resin or metal and press-fitted on the radially outside part of the outer ring member 42. That is, the first output shaft 21, the third bearing 15, the inner ring member 40, the pinion gear 41, the outer ring member 42 and the worm wheel 50 are arranged in this order from the radially inside part. The inner ring member 40, the outer ring member 42, the pinion gear shaft member 43 and the worm wheel 50 rotate together as a single body. The third bearing 15 rotatably supports the inner ring member 40, the outer ring member 42, the pinion gear shaft member 43 and the worm wheel 50 at a position radially outside the first output shaft 21.

Figure 3:
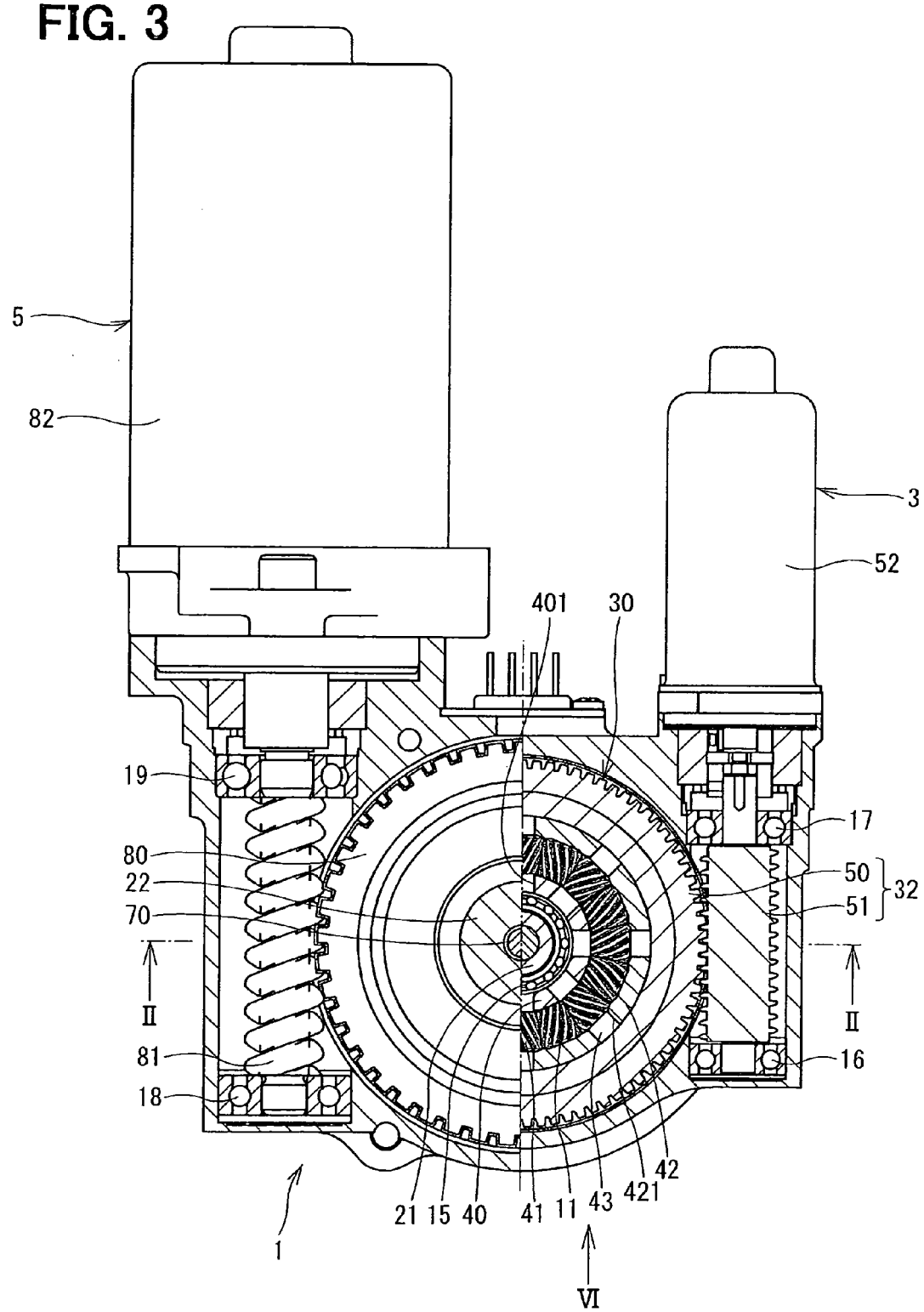
FIG. 3 is a sectional view of the steering control apparatus taken along a line in FIG. 2.

As shown in FIG. 3, the worm 51 meshes the radially outside part of the worm wheel 50. The worm 51 is supported rotatably by a fourth bearing 16 and a fifth bearing 17 provided in the housing 12. Here, the worm wheel 51 and the worm 50 are described with reference to FIG. 4 to FIG. 7.

The worm wheel 50 and the worm 51 are arranged such that a plane Q perpendicular to the rotation axis P1 of the worm wheel 50 and the rotation axis P2 of the worm 51 are parallel to each other. The tooth trace of the worm wheel 50 is formed to incline to the rotation axis P1 of the worm wheel 50 by an angle $\theta 1$. This angle of inclination corresponds to a lead angle. The lead angle $\theta 1$ is set to be smaller than a friction angle. As a result, the worm wheel 50 is rotated by the rotation of the worm 51. However, the worm 51 is not rotated by the rotation of the worm wheel 50. Thus, the worm wheel 50 and the worm 51 are capable of self-locking. The speed increase ratio is 1 when the worm wheel 50 and the worm 51 are self-locked.

The worm wheel 50 is formed such that its tooth bottom is distant from the rotation axis P1 by a constant distance. Thus, even if positions of the worm wheel 50 and the worm 51 deviate in the direction of rotation axis P1 because of manufacturing tolerance, for example, the worm wheel 50 and the worm 51 are maintained in abutting relation in both rotations in the normal direction and in the reverse direction.

Referring back to FIG. 2 and FIG. 3, the VGRS motor 52 is provided at a side of the fifth bearing 17 of the worm 51. The VGRS motor 52 is a brush motor. The VGRS motor 52 drives the worm 51 in forward and reverse directions in correspondence to energization (current supply). When the VGRS motor 52 drives the worm 51 in the forward direction and the worm wheel 50 correspondingly rotates in the same direction as the rotation direction of the input shaft 10, the rotation of the input shaft 10 is transferred to the output shaft 20 after being reduced in speed. When the VGRS motor 52 drives the worm 51 in the reverse direction and the worm wheel 50 correspondingly rotates in a direction opposite to the rotation direction of the input shaft 10, the rotation of the input shaft 10 is transferred to the output shaft 20 after being increased in speed. Thus, the rotation angle of the input shaft 10 and the rotation angle of the output shaft 20 are varied.

The EPS device 5 is provided at a position opposite to the VGRS motor 52 sandwiching the input shaft 10 and the output shaft 20. The EPS device 5 includes an EPS worm wheel 80, an EPS worm 81 and an EPS motor 82. The wheel 80 and the EPS worm 81 are accommodated within the housing 12.

The EPS worm wheel 80 is made of resin or metal. The EPS worm wheel 80 is press-fitted on the second output shaft 22 and rotates together with the second output shaft 22. The EPS worm 81 meshes the radially outside part of the wheel 80. The EPS worm 81 is supported rotatably by a sixth bearing 18 and a seventh bearing 19, which are provided in the housing 12. Teeth of the wheel 80 are so formed that each tooth line is parallel with the rotation shaft. A tooth bottom of the wheel 80 formed to be planer and not arcuate. Thus, even if the position of placing the wheel 80 deviates in the axial direction of the second output shaft 22 due to manufacturing error, contact between the wheel 80 and the EPS worm 81 can be maintained similarly in both cases of forward rotation and reverse rotation.

An EPS motor 82 is provided at a side of a seventh bearing 19 of the EPS worm 81. The EPS motor 82 is a brushless three-phase motor. The EPS motor 82 drives the EPS worm 81 to rotate in forward and reverse directions depending on energization. When the wheel 80 meshed with the EPS worm 81 applies steering assist torque to the second output shaft 22, steering operation is assisted. The VGRS device 3 and the EPS device 5 are provided on both sides of the output shaft 20, the radial loads generated when the VGRS motor 52 and the EPS motor 82 are driven are cancelled out and inclination of the output shaft 20 is suppressed. Since the inclination of the output shaft 20 is suppressed, the position of meshing of the worm wheel 50 and the worm 51 and the position of meshing of the EPS worm wheel 80 and the EPS worm 81 are surely maintained.

Figure 8:
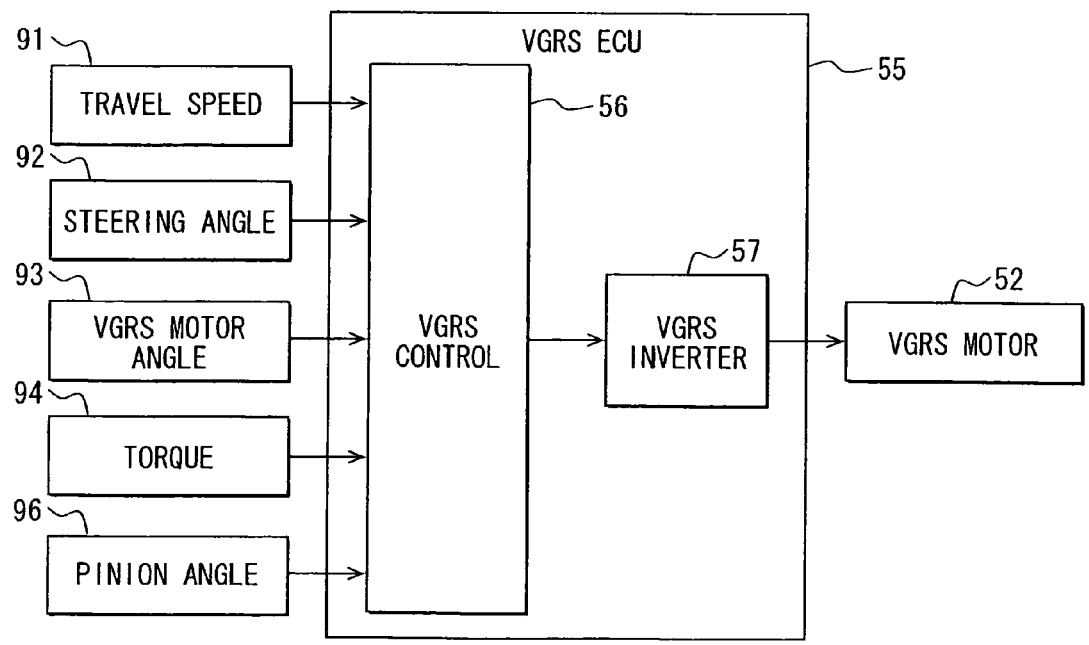
FIG. 8 is a block diagram showing a VGRS ECU provided in the steering control apparatus according to the first embodiment.
Figure 9:
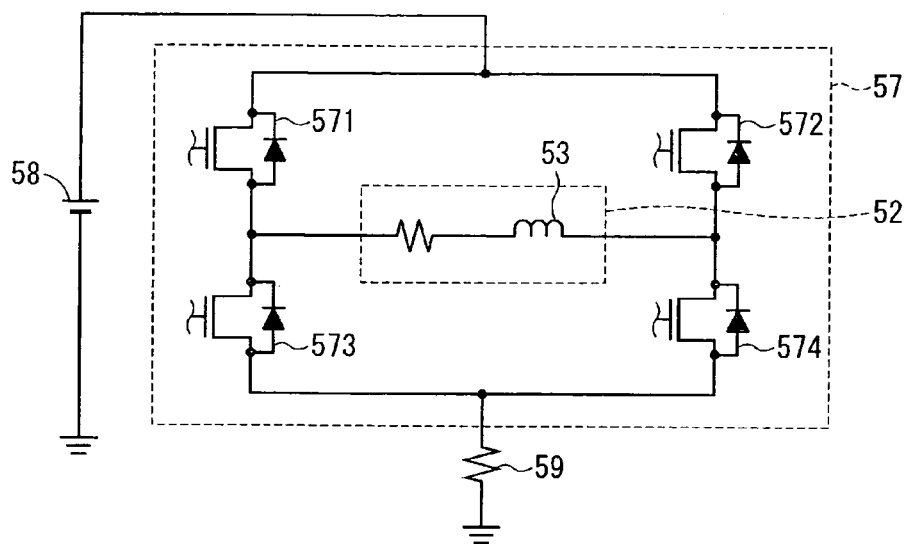
FIG. 9 is a circuit diagram showing a VGRS motor provided in the steering control apparatus according to the first embodiment.

A VGRS electronic control unit (VGRS ECU) for controlling drive of the VGRS motor 52 and an EPS electronic control unit (EPS ECU) for controlling drive of the EPS motor 82 will be described with reference to FIG. 8 to FIG. 10. FIG. 8 is a block diagram showing the VGRS ECU 55, FIG. 9 is a circuit diagram of a VGRS inverter 57 as an inverter device and FIG. 11 is a block diagram showing the EPS ECU 85.

As shown in FIG. 8, the VGRS ECU 55 includes a VGRS control part 56 and a VGRS inverter 57. The VGRS control part 56 is formed as an electronic computer circuit, which includes a CPU, a ROM, a RAM, an I/O and a bus line connecting these components, and performs drive control for the VGRS motor. The VGRS control part 56 is connected to a vehicle travel speed sensor 91 for detecting a vehicle travel speed of a vehicle, a steering angle sensor 92 for detecting a steering angle θh of the steering wheel 8, a VGRS motor rotation angle sensor 93 for detecting a rotation angle (VGRS motor rotation angle θm) of the VGRS motor 52, the torque sensor 94 for detecting steering torque generated when the steering wheel 8 is operated, a pinion angle sensor 96 for detecting a pinion angle θp, and the like. The torque sensor 94 may be a sensor, which is common with the EPS. The torque sensor value may be acquired from the EPS ECU 85 through communication such as CAN. The VGRS control part 56 controls the VGRS inverter 57 based on the vehicle travel speed, the steering angle θh, the VGRS motor rotation angle θm and the like. The control processing of the VGRS-control part 56 will be described later.

The circuit configuration of the VGRS inverter 57 will be described with reference to FIG. 9. As shown in FIG. 9, the VGRS inverter 57 is formed of four switching elements 571 to 574, which are connected in a bridge form. Each of the switching elements 571 to 574 are a MOSFET (metal-oxide-semiconductor field-effect transistor), which is one type of field-effect transistors. The switching elements 571 to 574 are referred to as FETs 571 to 574, respectively. In the VGRS inverter 57, the FETs 571 and 572 are connected to a positive side of a power source 58, and the FETs 573 and 574 are connected to the ground through a resistor 59. The VGRS motor 52 is connected between a junction of the FETs 571, 573 and a junction of the FETs 572, 574. The FETs 571 and 572, which are provided at the high potential side, are referred to as high-potential side switching elements. The FETs 573 and 574, which are provided at the low-potential side, are referred to as low-potential side switching elements. The FETs 571 and 572, which are high potential side switching elements, are referred to high-side FETs. The FETs 573 and 574, which are low-potential side switching elements, are referred to low-side FETs. The MOS 571 and the MOS 573, which are paired, and the MOS 572 and the MOS 574, which are paired, are referred to switching pairs, respectively. The FETs 571 to 574 are controlled to turn on and off by the VGRS control part 56 so that the current supplied to a coil 53 of the VGRS motor 52 is switched over. Thus, driving of the VGRS motor 52 is thus controlled.

Figure 10:
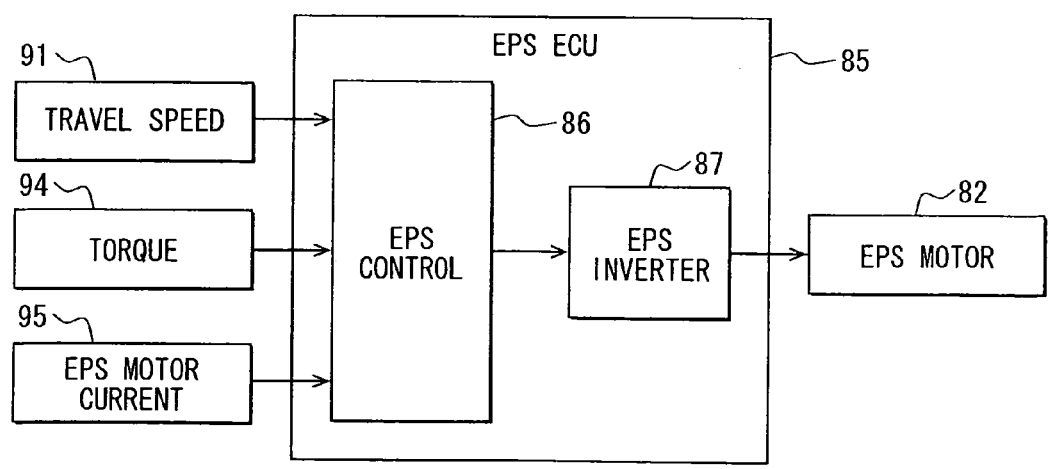
FIG. 10 is a block diagram showing an EPS ECU provided in the steering control apparatus according to the first embodiment.

As shown in FIG. 10, the EPS ECU 85 includes an EPS control part 86 and an EPS inverter 87. The EPS control part 86 is formed as an electronic computer circuit, which includes a CPU, a ROM, a RAM, an I/O and a bus line connecting these components, and performs drive control for the EPS motor 82. The EPS control part 86 is connected to the vehicle travel speed sensor 91, the torque sensor 94 for detecting steering torque of the steering wheel 8 and an EPS motor current sensor 95 for detecting motor current supplied to the EPS motor 82.

The EPS inverter 87 is a three-phase inverter, which is formed of a plurality of switching elements and switches over energization of the EPS motor 82. The switching elements forming the EPS inverter 87 are turned on and off by the EPS control part 86 based on the vehicle travel speed, the steering torque, the motor current and the like. That is, the EPS control part 86 controls operation of the EPS motor 82 by controlling the EPS inverter 87 based on the vehicle travel speed, the steering torque and the motor current.

Normal control processing, which is executed by the VGRS control part 56 when the VGRS device 3 has no abnormality, will be described next with reference to FIG. 11 to FIG. 14. A main part of the normal control processing of the VGRS control part 56 for the drive control of the VGRS motor 52 is shown in FIG. 11.

First at S100 (S indicates a step), a vehicle travel speed sensor value outputted by the vehicle travel speed sensor 91 is retrieved and the vehicle travel speed of the vehicle is acquired. Further, a steering wheel angle sensor value outputted by the steering wheel angle sensor 92 is retrieved and the steering angle of the steering wheel 8 is acquired. In addition, a VGRS motor rotation angle sensor value outputted by the VGRS motor rotation angle sensor 93 is retrieved and the VGRS motor rotation angle is acquired. At S110, VGRS motor rotation angle command value calculation processing is performed. At S120, VGRS motor rotation angle control calculation processing is performed. At S130, VGRS motor PWM command value calculation processing is performed. At S140, the operation of the VGRS motor 52 is controlled by switching over on/off of the switching elements forming the VGRS inverter 57 based on the PWM command value calculated at S130.

The VGRS motor rotation angle command value calculation processing will be described with reference to FIG. 12. At S111, the vehicle travel speed sensor value outputted by the vehicle travel speed sensor 91 is retrieved to acquire the vehicle travel speed of the vehicle. Further, the steering angle sensor value outputted by the steering wheel angle sensor 92 is retrieved to acquire the steering angle θh of the steering wheel 8. It is assumed that the steering angle is positive and negative, when the steering wheel 8 is operated in the clockwise direction and the counter-clockwise direction, respectively. By the operation of the differential gear 31, the output shaft 20 rotates in the counter-clockwise direction when the steering wheel 8 and the input shaft 10 rotates in the clockwise direction. The output shaft 20 rotates in the clockwise direction when the steering wheel 8 and the input shaft 10 rotate in the counter-clockwise direction. For this reason, the pinion angle θp, which is the rotation angle of the output shaft 20, is assumed to be positive and negative in case of rotations in the counter-clockwise direction and the clockwise direction, respectively.

At S112, the speed increase ratio z is calculated based on the travel speed acquired at S111. The relation between the travel speed and the speed increase ratio z is stored as a function shown in FIG. 15. That is, as understood from FIG. 15, the speed increase ratio z increases with an increase in the travel speed when the travel speed is lower than a predetermined speed value. The speed increase ratio z however decreases with an increase in the travel speed when the travel speed is higher than the predetermined speed value. The speed increase ratio z is a ratio between the steering wheel angle θh and the pinion angle θp. Therefore, a set rotation angle of the output shaft 20 is calculated by multiplying the steering wheel angle. In case that the speed increase ratio z is 1, the steering wheel angle θh and the pinion angle θp agree.

Referring to FIG. 12, at S113, a VGRS motor rotation angle command value θc is calculated thus ending the processing. The VGRS motor rotation angle command value θc is calculated by the following equation (1), assuming that θh is the steering angle acquired at S111, z is the speed increase ratio calculated at S112 and i is a reduction ratio of the worm gear 32.

$$\theta c = \theta h \times (z-1) \times i \times 0.5 \quad (1)$$

The VGRS motor rotation angle control calculation processing will be described next with reference to FIG. 13. At S121, the VGRS motor rotation angle command value θc calculated at S113 in FIG. 12 is retrieved. Further, a VGRS motor rotation angle sensor value outputted by the VGRS motor rotation angle sensor 93 is retrieved to acquire the VGRS motor rotation angle θm. At S122, an angle difference value θd is calculated. The VGRS motor rotation angle difference value θd is calculated by the following equation (2).

$$\theta d = \theta c - \theta m \quad (2)$$

At S123, a VGRS motor voltage command value Vvc is calculated, thereby ending this processing. The VGRS motor voltage command value Vvc is feedback-controlled by using PI control. Assuming that a proportional gain and an integral gain in the VGRS motor feedback-control are KPv and KIv, respectively, the VGRS motor voltage command value Vvc is calculated by the following equation (3).

$$Vvc = KPv \times \theta d + KIv \times \int \theta d \, dt \quad (3)$$

Figure 14:
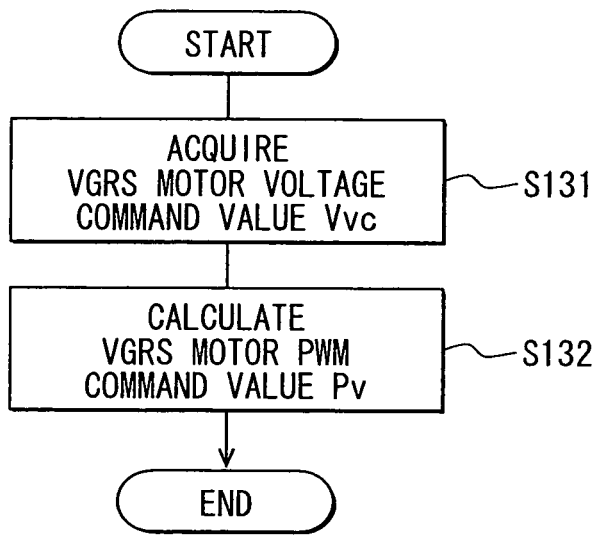
FIG. 14 is a flowchart showing PWM command value calculation processing executed in the first embodiment.
Figure 15:
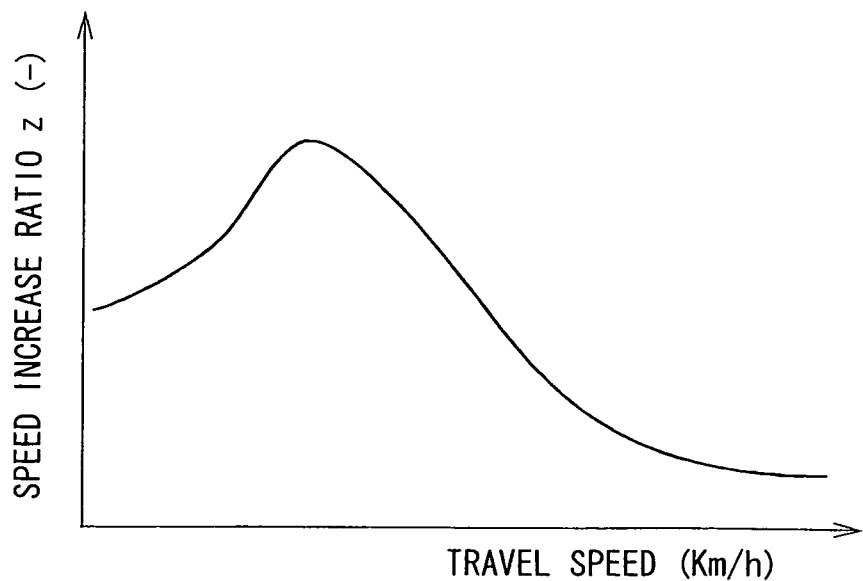
FIG. 15 is a graph showing a relation between a travel speed and a speed increase ratio in the first embodiment.

The VGRS motor PWM command value calculation processing will be described with reference to FIG. 14. At S131, the VGRS motor voltage command value Vvc calculated at S123 in FIG. 13 is acquired. At S132, a VGRS motor PWM command value Pv is calculated. Assuming that a battery voltage is Vb, the VGRS motor PWM command value is calculated by the following equation (4).

$$Pv = Vvc/Vb \times 100 \quad (4)$$

The VGRS control part 56 controls the operation of the VGRS motor 52 by controlling timing of on/off of the switching elements of the VGRS inverter 57 (S140 in FIG. 11) based on the VGRS motor PWM command value Pv calculated at S132. The ratio between the rotation angle of the input shaft 10 and the rotation angle of the output shaft 20 is varied by driving the VGRS motor 52. Thus, the VGRS control part 56 makes the steered angle of the vehicle wheels 7 variable relative to the steering angle θh by controlling driving of the VGRS motor 52.

Here, a case that the speed increase ratio is 1 is described. In case that the speed increase ratio is 1, the VGRS motor rotation angle command value θc calculated by the equation (1) becomes 1. The worm gear 32 has a self-lock function and, hence, the worm 51 is not rotated by the rotation of the worm wheel 50. The VGRS motor 52 is not rotated either by the rotation of the worm wheel 50 through the worm 51. For this reason, if the VGRS motor rotation angle command value θc is approximately 0, that is, if the speed increase ratio is 1, the rotation angle becomes 0 when energization of the VGRS motor 52 is turned off. Thus, since energization of the VGRS motor 52 can be turned off when the speed increase ratio is 1, power consumption can be reduced.

When a self-lock failure, which disables the self-lock function, arises in the worm gear 32, the steering torque generated by steering the steering wheel 8 cannot be transferred to the output shaft 20 side and the steeling wheel 8 is idled. It is therefore monitored whether the worm gear 32 has the self-lock failure. If the self-lock failure is present, the steering wheel 8 is controlled not to idle.

The self-lock check processing for monitoring the self-lock failure in the worm gear 32 will be described with reference to FIG. 16 to FIG. 21. This self-lock check processing is repeated at every predetermined interval during travel of the vehicle. At S500, self-lock failure detection processing is executed to check whether the self-lock failure is present. The self-lock failure detection processing will be described with reference to FIG. 17 to FIG. 23. If the self-lock failure is detected, a self-lock failure flag is set.

At S600, it is checked whether the self-lock failure flag is set to ON. If it is determined that the self-lock failure flag is not set (S600:NO), that is, if the worm gear 32 has no self-lock failure, S800 is executed. If it is determined that the self-lock failure flag is set (S600:YES), that is, if the worm gear 32 has the self-lock failure, S700 is executed.

At S700, idling suppression processing is executed so that the steering wheel 8 does not run idle. The idling suppression processing will be described with reference to FIG. 22 and FIG. 23. At S800, which is executed if the self-lock failure flag is not set (S600:NO), a normal control processing routine shown in FIG. 11 to FIG. 14 is executed to control driving of the VGRS motor 52.

Figure 16:
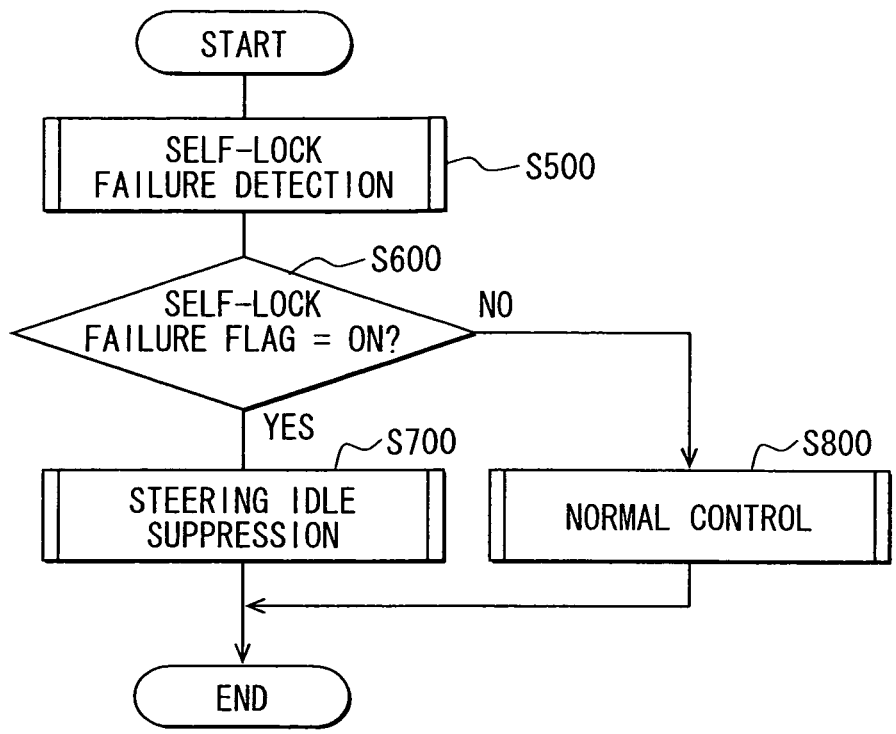
FIG. 16 is a flowchart showing self-lock check processing executed in the first embodiment.

The self-lock failure detection processing, which is executed at S500 in FIG. 16 for detecting the self-lock failure of the worm gear 32, will be described with reference to FIG. 17 to FIG. 21. FIG. 17 to FIG. 21 show flowcharts of the self-lock failure detection processing (1) to (5), respectively. Only one of the self-lock failure detection processing (1) to (5) may be executed or a plurality of the same may be executed in parallel.

<Self-Lock Failure Detection Processing (1)>

The self-lock failure detection processing (1) detects the self-lock failure based on that the voltage command value for the VGRS motor 52 becomes 0 and the rotation angle of the VGRS motor 52 becomes 0, when the speed increase ratio is 1 and the self-lock operation is normal. The self-lock failure detection processing (1) will be described with reference to FIG. 17.

At S511, it is checked whether the VGRS motor 52 is turned off (energization:OFF). It is possible to check it by checking whether an absolute value of an energization voltage to the VGRS motor 52 is less than a predetermined value, because it may be influenced by noises. If it is determined that the VGRS motor 52 is not turned off (S511:NO), S511 to S516 are not executed. If it is determined that energization of the VGRS motor 52 is turned off (S511:YES), S512 is executed.

At S512, the VGRS motor rotation angle sensor value outputted by the VGRS motor rotation angle sensor 93 is retrieved and the VGRS motor rotation angle θm is acquired. At S513, it is checked whether the acquired VGRS motor rotation angle θm is approximately 0. If it is determined that the VGRS motor rotation angle θm is approximately 0 (S513:YES), S516 is executed. If it is determined that the VGRS motor rotation angle θm is not approximately 0 (S513:NO), S514 is executed.

At S514, it is checked whether a predetermined time has elapsed. If it is determined that the predetermined time has not yet elapsed (S514:NO), S511 to S514 are executed again. If it is determined that the predetermined time has elapsed (S514:YES), S515 is executed. At S515, the self-lock failure flag is turned on (set to ON), because the worm gear 32 has abnormality in its self-lock function.

At S516, which is executed if the VGRS motor 52 is turned off (S511:YES) and the VGRS motor rotation angle is approximately 0 (S513:YES), the self-lock function of the worm gear 32 is normal and hence the self-lock failure flag is turned off (set to OFF). It is possible to immediately execute S515 without S514, if the determination result at S513 is NO.

<Self-Lock Failure Detection Processing (2)>

Self-lock failure detection processing (2) detects the self-lock failure based on that the rotation angle command value θc for the VGRS motor 52 becomes 0 and the voltage command value Vvc for the VGRS motor 52 becomes 0, when the speed increase ratio is 1 and the self-lock operation is normal. The self-lock failure detection processing (2) will be described with reference to FIG. 18.

At S521, it is checked whether the VGRS motor rotation angle command value θc is approximately 0. The VGRS motor rotation angle command value θc is calculated in the similar manner as S113 in FIG. 12. If it is determined that the VGRS motor rotation angle command value θc is not 0 (S521:NO), S522 to S525 are not executed. If it is determined that the VGRS motor rotation angle command value θc is approximately 0 (S521:YES), S522 is executed.

At S522, it is checked whether the VGRS motor voltage command value Vvc is approximately 0. The VGRS motor voltage command value Vvc is calculated in the similar manner as S123 in FIG. 13. If it is determined that the VGRS motor voltage command value Vvc is approximately 0 (S522:YES), S525 is executed. If it is determined that the VGRS motor voltage command value Vvc is not 0 (S522:NO), S523 is executed.

At S523, it is checked whether a predetermined time has elapsed. If it is determined that the predetermined time has not yet elapsed (S523:NO), S521 to S523 are executed again. If it is determined that the predetermined time has elapsed (S523:YES), S524 is executed. At S524, the self-lock failure flag is turned on (set to ON), because the worm gear 32 has abnormality in its self-lock function.

At S525, which is executed if the VGRS motor rotation angle command value θc is approximately 0 (S521:YES) and the VGRS motor voltage command value Vvc is approximately 0 (S522:YES), the self-lock function of the worm gear 32 is normal and hence the self-lock failure flag is turned off (set to OFF). It is possible to immediately execute S524 without execution of S523, if the determination result at S522 is NO.

<Self-Lock Failure Detection Processing (3)>

Self-lock failure detection processing (3) detects the self-lock failure based on that a set rotation angle equals the pinion angle θp, when the self-lock operation is normal. The set rotation angle is a product of the steering wheel angle θh and the speed increase ratio z. The self-lock failure detection processing (3) will be described with reference to FIG. 19.

At S531, the steering wheel angle θh is acquired by retrieving the output value of the steering angle sensor 92, which detects the steering wheel angle. The pinion angle θp is acquired by retrieving the output value of the pinion angle sensor 96, which detects the pinion angle. Further, the speed increase ratio z is acquired based on the travel speed. The pinion angle θp may be estimated based on the VGRS motor rotation angle θm. At S532, the set rotation angle is calculated by multiplying the acquired steering wheel angle θh by the speed increase ratio z. Then it is checked whether a difference, which results from subtraction of the pinion angle θp from the calculated set rotation angle, is approximately 0. If it is determined that the difference between the pinion angle θp and the set rotation angle is approximately 0 (S532:YES), that is, the set rotation angle equals the pinion angle θp, S535 is executed. If it is determined that the difference between the pinion angle θp and the set rotation angle is not 0 (S532:NO), that is, the set rotation angle does not equal the pinion angle θp, S533 is executed.

At S533, it is checked whether a predetermined time has elapsed. If it is determined that the predetermined time has not yet elapsed (S533:NO), S531 to S533 are executed again. If it is determined that the predetermined time has elapsed (S533:YES), S534 is executed. At S534, the self-lock failure flag is turned on (set to ON), because the worm gear 32 has abnormality in its self-lock function.

At S535, which is executed if the difference between the set rotation angle and the pinion angle θp is approximately 0 (S532:YES), the self-lock function of the worm gear 32 is normal and hence the self-lock failure flag is turned off (set to OFF). It is possible to immediately execute S534 without execution of S533, if the determination result at S532 is NO.

<Self-Lock Failure Detection Processing (4)>

If the self-lock function of the worm gear 32 is normal, torque is transferred to the output shaft 20 side and detected as the steering torque by the torque sensor 94 when the steering wheel 8 is operated. If the steering wheel 8 idles because of self-lock failure, torque is not transferred to the output shaft 20 side and is not detected by the torque sensor 94. Self-lock failure is detected in self-lock failure detection processing based on the steering torque. The self-lock failure detection processing (4) will be described with reference to FIG. 20.

At S541, it is checked whether the steering wheel 8 is being rotated as steering operation. If it is determined that the steering wheel 8 is not in the steering operation (S541:NO), S542 to S546 are not executed. If it is determined that the steering wheel 8 is in the steering operation (S541:YES), S542 is executed. At S542, the torque sensor value outputted by the torque sensor 94 is retrieved and the steering torque Tq generated by the steering operation of the steering wheel 8 is acquired.

At S543, it is checked whether the acquired steering torque Tq is approximately 0. If it is determined that the steering torque Tq is not approximately 0 (S543: NO), S546 is executed. If it is determined that the steering torque Tq is approximately 0 (S543:YES), S544 is executed. At S544, it is checked whether a predetermined time has elapsed. If it is determined that the predetermined time has not yet elapsed (S544:NO), S541 to S544 are executed again. If it is determined that the predetermined time has elapsed (S544:YES), S545 is executed. At S545, the self-lock failure flag is turned on (set to ON), because the worm gear 32 has abnormality in its self-lock function.

At S546, which is executed if the steering wheel 8 is in the steering operation (S541:YES) and the steering torque Tq is not approximately 0 (S543:NO), the self-lock function of the worm gear 32 is normal and hence the self-lock failure flag is turned off (set to OFF). It is possible to immediately execute S545 without executing S544, if the determination result at S543 is YES.

<Self-Lock Failure Detection Processing (5)>

If the self-lock function of the worm gear 32 is normal, the steering wheel 8 does not idle. As a result, the steering angle θh becomes 0 when the vehicle travels straight. If the steering wheel 8 idles because of self-lock failure, the steering wheel 9 is likely to idle. In this case, the steering wheel angle θh deviates from 0 even when the vehicle travels straight. Self-lock failure is detected in self-lock failure detection processing (5) based on the steering wheel angle θh. The self-lock failure detection processing (5) will be described with reference to FIG. 21.

At S551, it is checked whether the vehicle is traveling straight ahead. Whether the vehicle is traveling straight may be checked in the conventional manner. For example, it is determined that the vehicle is traveling straight if differences in wheel rotation speeds among four vehicle wheels are small. As another example, it is determined that the vehicle is traveling straight if a yaw rate sensor or an acceleration sensor detects no yaw or no lateral acceleration. If it is determined that the vehicle is not traveling straight (S551:NO), S552 to S556 are not executed. If it is determined that the vehicle is traveling straight (S551:YES), S552 is executed. At S552, the steering angle sensor value outputted by the steering angle sensor 92 is retrieved and the steering wheel angle θh is acquired.

At S553, it is checked whether the steering wheel angle θh is approximately 0. If it is determined that the steering wheel angle θh is approximately 0 (S553:YES), S556 is executed. If it is determined that the steering wheel angle θh is not approximately 0 (S553:NO), S554 is executed.

At S554, it is checked whether a predetermined time has elapsed. If it is determined that the predetermined time has not yet elapsed (S554:NO), S551 to S554 are executed again. If it is determined that the predetermined time has elapsed (S554:YES), S555 is executed. At S555, the self-lock failure flag is turned on (set to ON), because the worm gear 32 has abnormality in its self-lock function.

At S556, which is executed if the vehicle is traveling straight (S551:YES) and the steering wheel angle θh is approximately 0 (S553:YES), the self-lock function of the worm gear 32 is normal and hence the self-lock failure flag is turned off (set to OFF). It is possible to immediately execute S555 without executing S554, if the determination result at S553 is YES.

Figure 17:
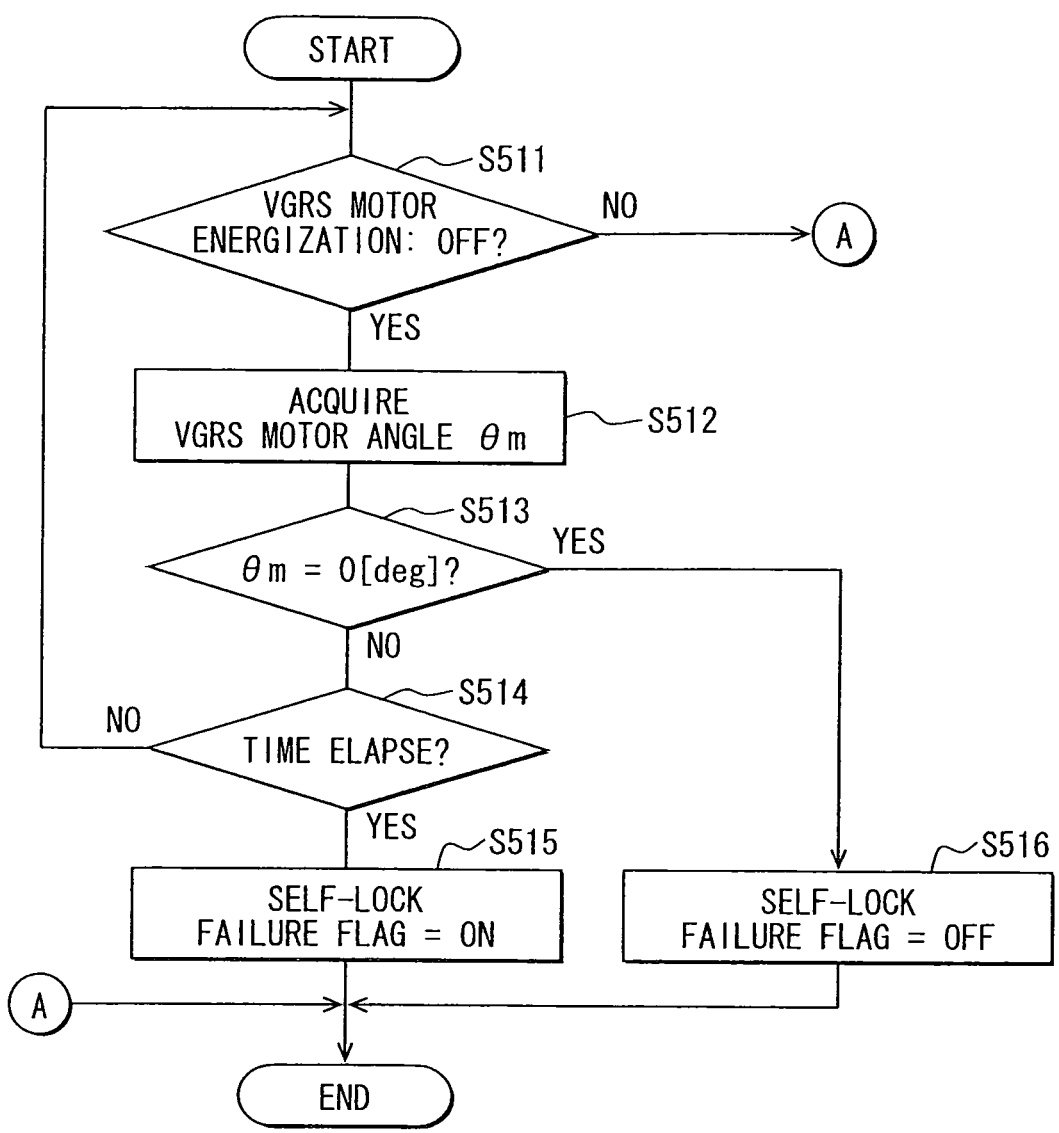
FIG. 17 is a flowchart showing self-lock failure detection processing (1) executed in the first embodiment.
Figure 18:
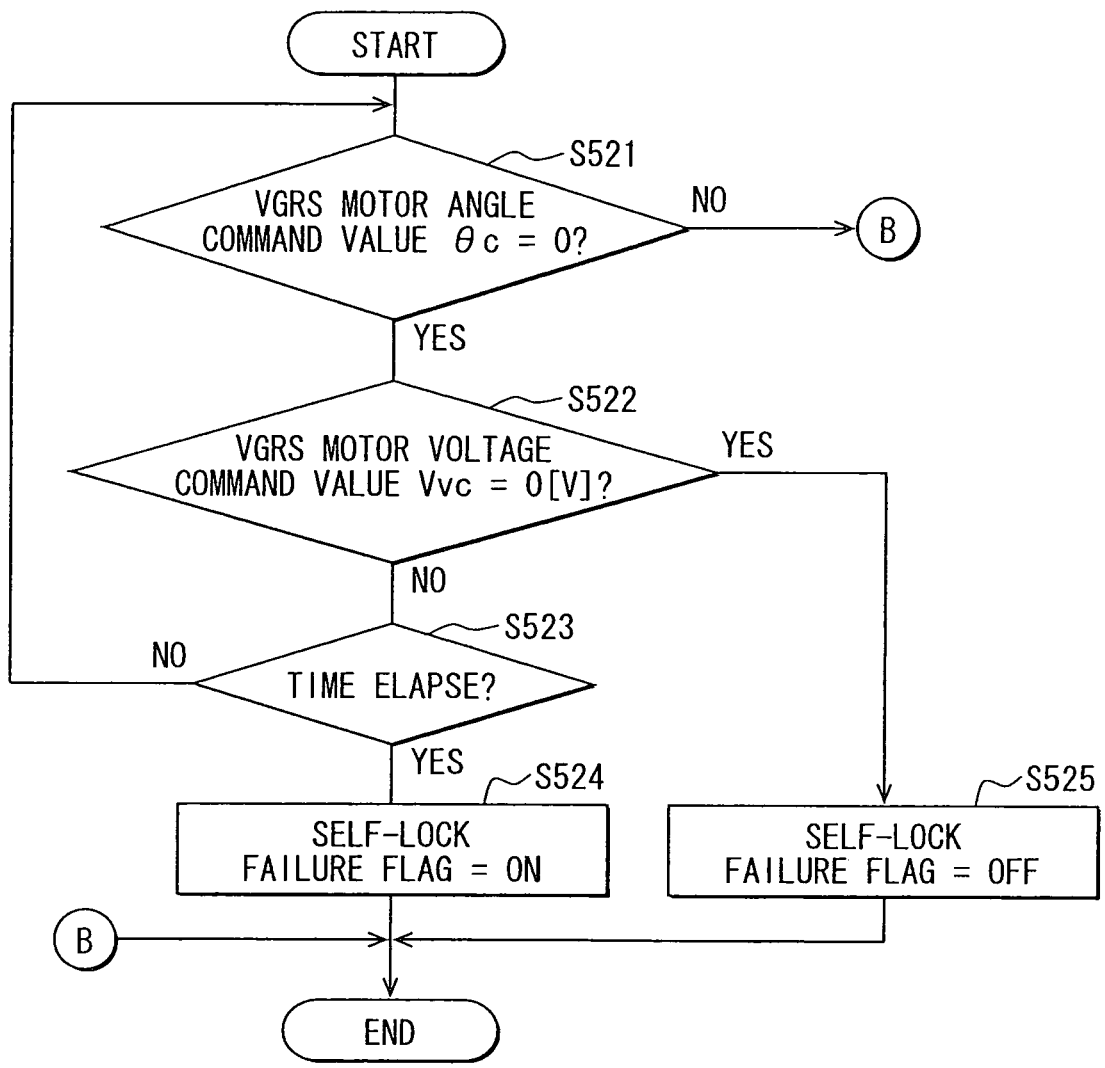
FIG. 18 is a flowchart showing self-lock failure detection processing (2) executed in the first embodiment.
Figure 19:
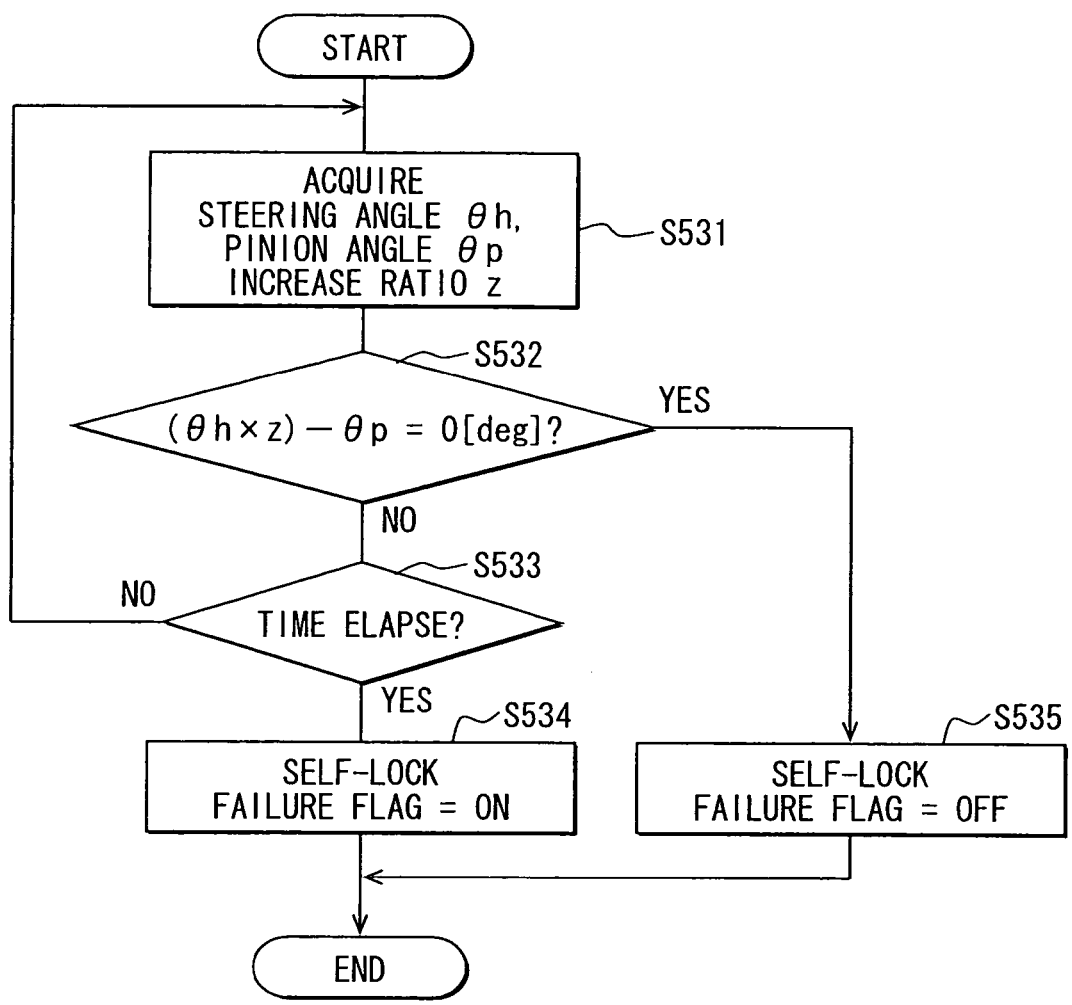
FIG. 19 is a flowchart showing self-lock failure detection processing (3) executed in the first embodiment.
Figure 20:
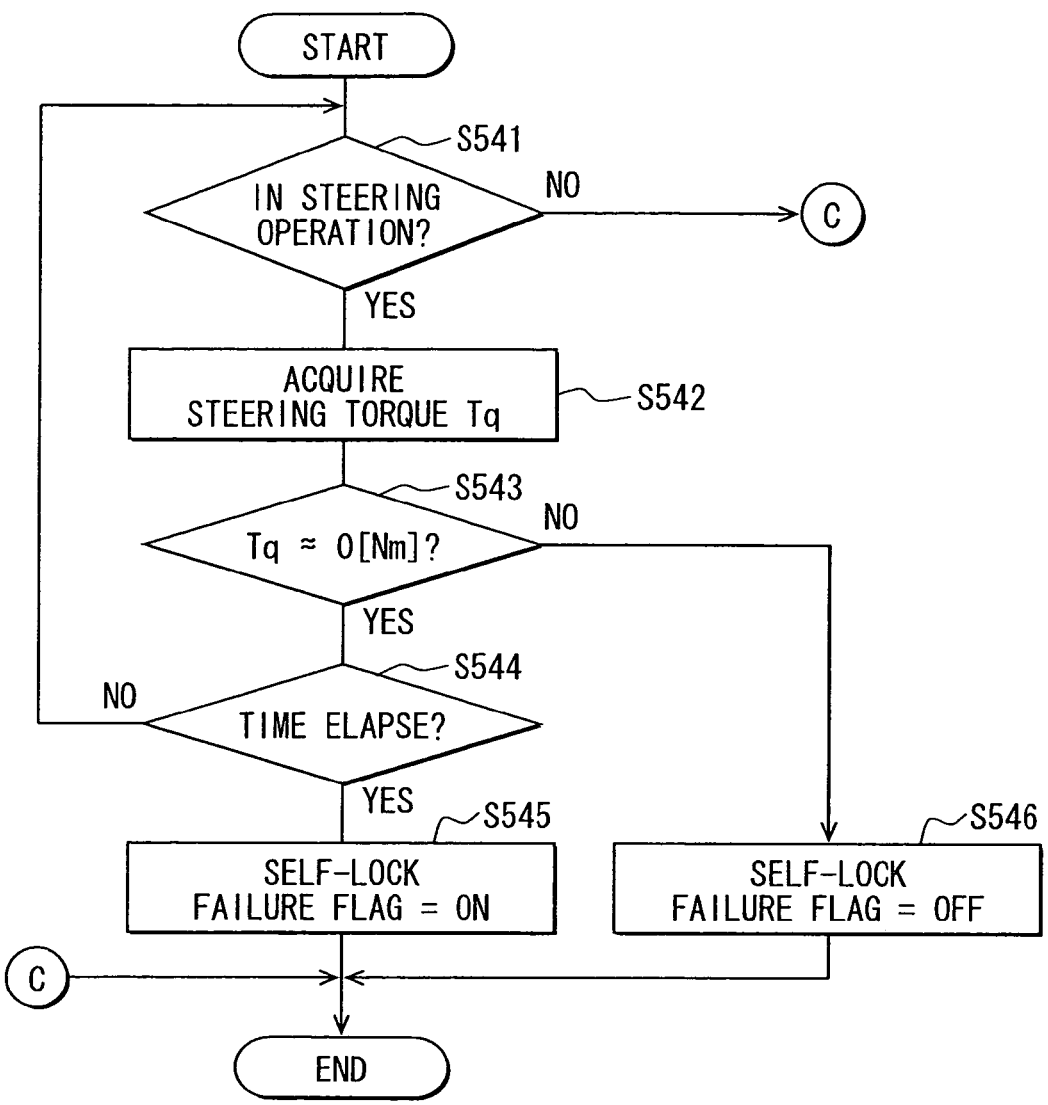
FIG. 20 is a flowchart showing self-lock failure detection processing (4) executed in the first embodiment.
Figure 21:
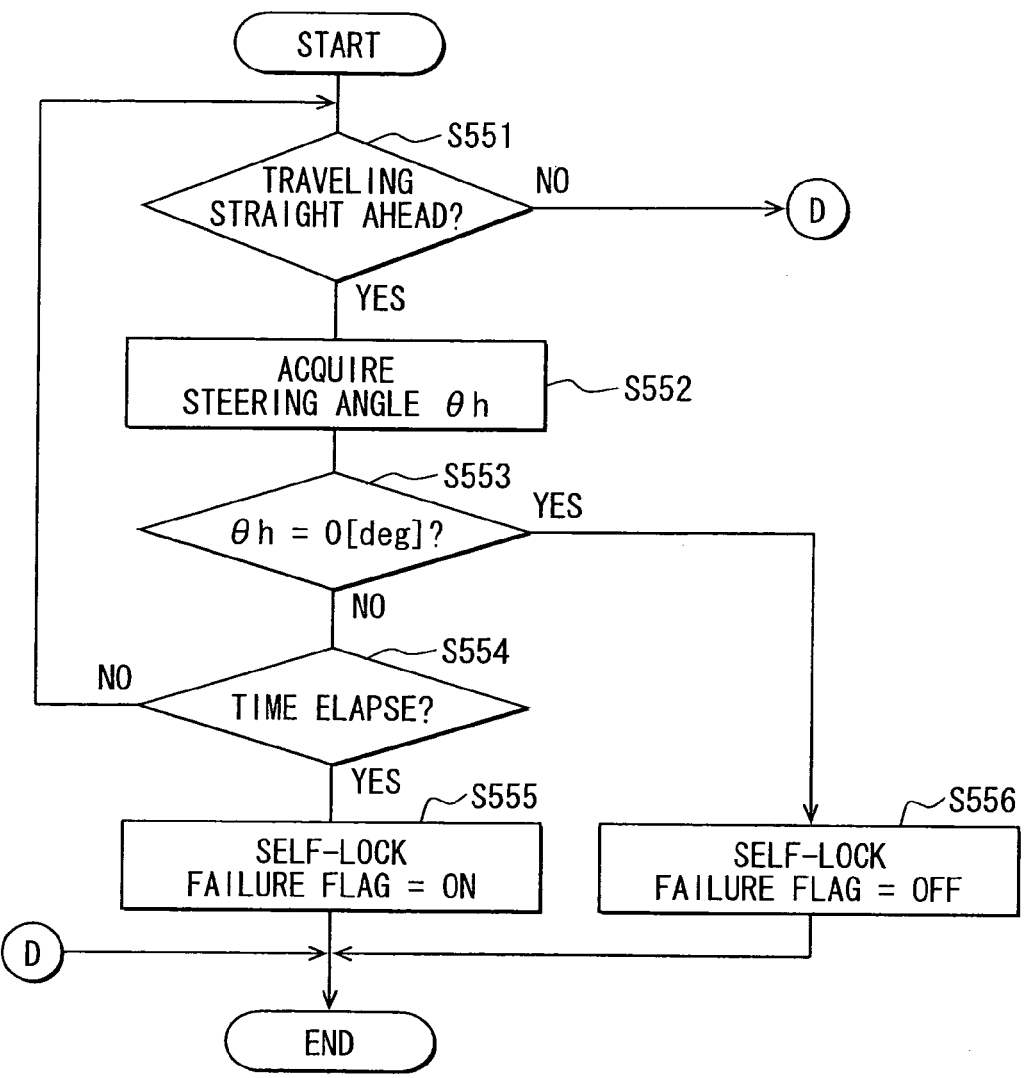
FIG. 21 is a flowchart showing self-lock failure detection processing (5) executed in the first embodiment.

It is to be noted that, although elapse of the predetermined time is checked at S514 in FIG. 17, S523 in FIG. 18, S533 in FIG. 19, S544 in FIG. 20 and S554 in FIG. 21, the predetermined times may be set arbitrarily. The predetermined times may be the same or different among the processing (1) to (5). It is also to be noted that, in checking whether the values are approximately 0 in the self-lock detection processing (1) to (5), it may be determined that the values are 0 if absolute values of the same are equal to or smaller than the predetermined values. Thus, influence of noise can be eliminated. This is also true in the following embodiments as well.

Figure 22:
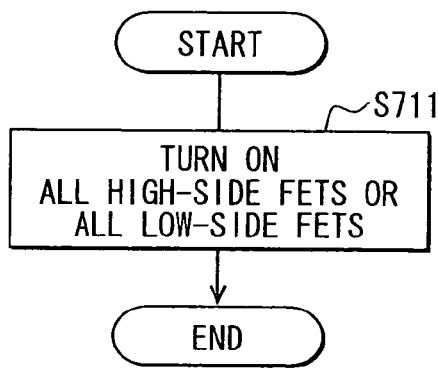
FIG. 22 is a flowchart showing idling suppression processing (1) executed in the first embodiment.
Figure 23:
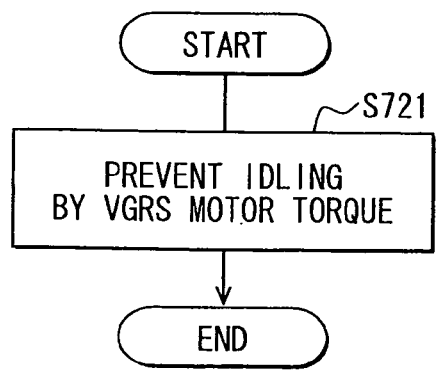
FIG. 23 is a flowchart showing idling suppression processing (2) executed in the first embodiment.

The steering wheel idling suppression processing executed at S700 in FIG. 16 will be described next with reference to FIG. 22 and FIG. 23. FIG. 22 and FIG. 23 show flowcharts of the idling suppression processing (1) and (2), respectively. Either of the idling suppression processing (1) or (2) may be executed.

<Idling Suppression Processing (1)>

The idling suppression processing (1) will be described with reference to FIG. 22. At S711, both the high-side FET 571 and the high-side FET 572 are turned on at the same. Alternatively, both the low-side MOS 573 and the low-side MOS 574 are turned off at the same time. Thus, a closed circuit is formed by the motor 25 and the VGRS inverter 57 so that regenerative braking is generated and the VGRS motor 52 is electrically locked. As a result, idling of the steering wheel 8 is suppressed. The steering torque is transferred to the output shaft 20 so that the vehicle may be turned in the same direction as the direction, in which the steering wheel 8 is steered. In this embodiment, the VGRS motor 52 is a brush motor and the VGRS inverter 57 is provided with two high-side FETs and two low-side FETs. However, even in a case that the VGRS motor 52 is a multi-phase (for example, three-phase) brushless motor and the VGRS inverter 57 is also a multi-phase inverter, a closed circuit is formed by turning on all of the high-side FETs or all of the low-side FETs. As a result, the regenerative braking is generated and the idling of the steering wheel 8 can be suppressed.

<Idling Suppression Processing (2)>

The idling suppression processing (2) will be described with reference to FIG. 23. As described above, if the speed increase ratio is 1 and the self-lock function is normal, the VGRS motor rotation angle command value θc and VGRS motor voltage command value Vvc both become approximately 0. As a result, energization of the VGRS motor 52 is turned off. If the self-lock failure is present, the VGRS motor 52 will be rotated by the torque from the worm wheel 50 side.

To counter this, at S721, driving the VGRS motor 52 is controlled so that a canceling torque is applied to the worm 51 when the speed increase ratio is 1. This canceling torque cancels out torque, which is applied to the worm 51 by rotation of the worm wheel 50. That is, although energization of the VGRS motor 52 is turned off if the self-lock function is normal, energization of the VGRS motor 52 may be maintained when the self-lock failure is present thereby to maintain the energization of the VGRS motor 52 and suppress idling of the steering wheel 8.

In the normal control shown in FIG. 11 to FIG. 14, when torque is applied from the worm wheel 50 side to the VGRS motor 52 side, feedback control is performed (S122 and S123 in FIG. 13) so that such torque is cancelled out and the VGRS motor rotation angle θm attains the VGRS motor rotation angle command value θc. Thus, the idling suppression processing (2) corresponds to continuation of the normal control.

As described above, according to the first embodiment, the input shaft 10 is coupled to the steering wheel 8, which is operated by a driver. The output shaft 20 is provided rotatably relative to the input shaft 10 and forms the torque transfer path, which transfers the steering force applied to the steering wheel 8 to the steered vehicle wheel 7 side. The differential gear 31 includes the input gear 11 rotatable with the input shaft 10, the output gear 23 rotatable with the output shaft 20 and the pinion gear 41, which engage the input gear 11 and the output gear 23. The inner ring member 40, the outer ring member 42 and the pinion gear shaft member 43 support the pinion gear 41 rotatably. The worm gear 32 includes the inner ring member 40, the outer ring member 42, the worm wheel 50 rotatable with the pinion gear shaft member 43 and the worm 51 engaged with the worm wheel 50. In the worm gear 32, the worm wheel 50 rotates with rotation of the worm 51. However, the worm gear 32 has the lead angle, which is capable of being self-locked so that the worm 51 is not rotated by the rotation of the worm wheel 50. The speed increase ratio z is fixed to 1 when the worm wheel 50 and the worm 51 are self-locked. The VGRS motor 52 drives the worm 51 by rotation. The VGRS control part 56 acquires the steering wheel angle θh (S100 in FIG. 11) and controls driving of the VGRS motor 52 based on the steering wheel angle θh (S140). Driving of the VGRS motor 52, which drives the worm 51 to rotate, is controlled, the steered angle of the vehicle wheels 7 is made variable relative to the steering wheel angle θh by operation of the differential gear 31 and the worm gear 32.

The worm wheel 50 and the worm 51 are configured to be capable of being self-locked. Therefore, the lock mechanism, which fixes the steered angle of the vehicle wheels 7 relative to the steering wheel angle θh, need not be provided separately from the gear mechanism 30. The overall size of the apparatus can thus be reduced.

According to a conventional exemplary lock mechanism, a lock pin is driven by a solenoid or the like. Therefore it is possible to readily detect abnormality of the lock mechanism by monitoring the solenoid. The lock mechanism according to the first embodiment is a self-lock in the worm gear 32. As a result, abnormality of the lock mechanism cannot be detected by monitoring the solenoid or the like. For this reason, according to the first embodiment, the VGRS control part 56 checks whether the worm gear 32 has self-lock abnormality (S600 in FIG. 16), which disables the self-lock operation. If it is determined that the self-lock abnormality is present (S600:YES), the idling control processing is executed to suppress idling of the steering wheel 8 (S700). Thus, the steering wheel 8 is suppressed from idling even at the time of the self-lock failure. As a result, the vehicle can be turned in the same direction as the steering wheel 8 is operated and safety is enhanced.

The self-lock detection processing may be executed in the following manners (1) to (5).

(1) The VGRS control part 56 acquires the VGRS motor rotation angle θm (S512) when the energization to the VGRS motor 52 is turned off (S511:YES in FIG. 17). The VGRS control part 56 sets the self-lock failure flag (S515) when the VGRS motor rotation angle θm is not 0 (S513:NO).

(2) The VGRS control part 56 sets the self-lock failure flag (S524) when the VGRS motor rotation angle command value θc is approximately 0 (S521:YES in FIG. 18) and the VGRS motor voltage command value Vvc is not approximately 0 (S522:NO).

(3) The VGRS control part 56 acquires the steering wheel angle θh, the pinion angle θp and the speed increase ratio z (S531 in FIG. 19). The VGRS control part 56 sets the self-lock failure flag (S534) when the set rotation angle of the output shaft 20 does not equal the pinion angle θp (S532:NO). The set rotation angle is calculated based on the speed increase ratio z and the steering wheel angle θh.

(4) The VGRS control part 56 checks whether the input shaft 10 is in rotation, and acquires the steering torque generated by the steering operation of the steering wheel 8 (S542) when it is determined that the input shaft 10 is in rotation (S541:YES in FIG. 20). The VGRS control part 56 sets the self-lock failure flag (S545) when the steering torque is approximately 0 (S543:YES).

(5) The VGRS control part 56 checks whether the vehicle is traveling straight. When the vehicle is traveling straight (S551:YES in FIG. 21), the VGRS control part 56 acquires the steering wheel angle θh (S552). When the steering wheel angle θh is not 0 (S553:NO), the VGRS control part 56 sets the self-lock failure flag (S555). By the processing (1) to (5), it can be checked properly whether the self-lock function of the worm gear 32 is operating normally.

The idling suppression processing may be executed in the following manners (1) and (2).

(1) The steering control apparatus 1 includes the VGRS inverter 57, which switches over current supplied to the coil 53 of the VGRS motor 52. The inverter 67 includes the FETs 571 to 574, which form switching pairs of the high-side FETs 571, 572, which are provided at the high potential side, and the low-side FETs 573, 574, which are provided at the low potential side. The VGRS control part 56 turns on all the high-side FETs 571, 572 or all the low-side FETs 573, 574 at the same time (S711 in FIG. 22), when it is determined that the self-lock failure is present in the worm gear 32. When all the high-side FETs 571, 572 or all the low-side FETs 573, 574 are turned on, the VGRS motor 52 and the VGRS inverter 57 form a closed circuit so that regenerative braking is generated. This regenerative braking operates to suppress the idling of the steering wheel 8. As a result, the vehicle can be steered safely in the same direction as the steering wheel 8 is steered.

(2) The VGRS control part 56 controls driving of the VGRS motor 52 (S721 in FIG. 23) to apply torque to the worm 51 thereby to cancel out the torque, which is applied to the worm 51 by the rotation of the worm wheel 50, when it is determined that the self-lock failure is present in the worm gear 32. Thus, the worm wheel 50 and the worm 51 are locked by the torque generated by the VGRS motor 52 to suppress idling of the steering wheel 8. As a result, the vehicle can be steered safely in the same direction as the steering wheel 8 is steered.

Second Embodiment

Figure 24:
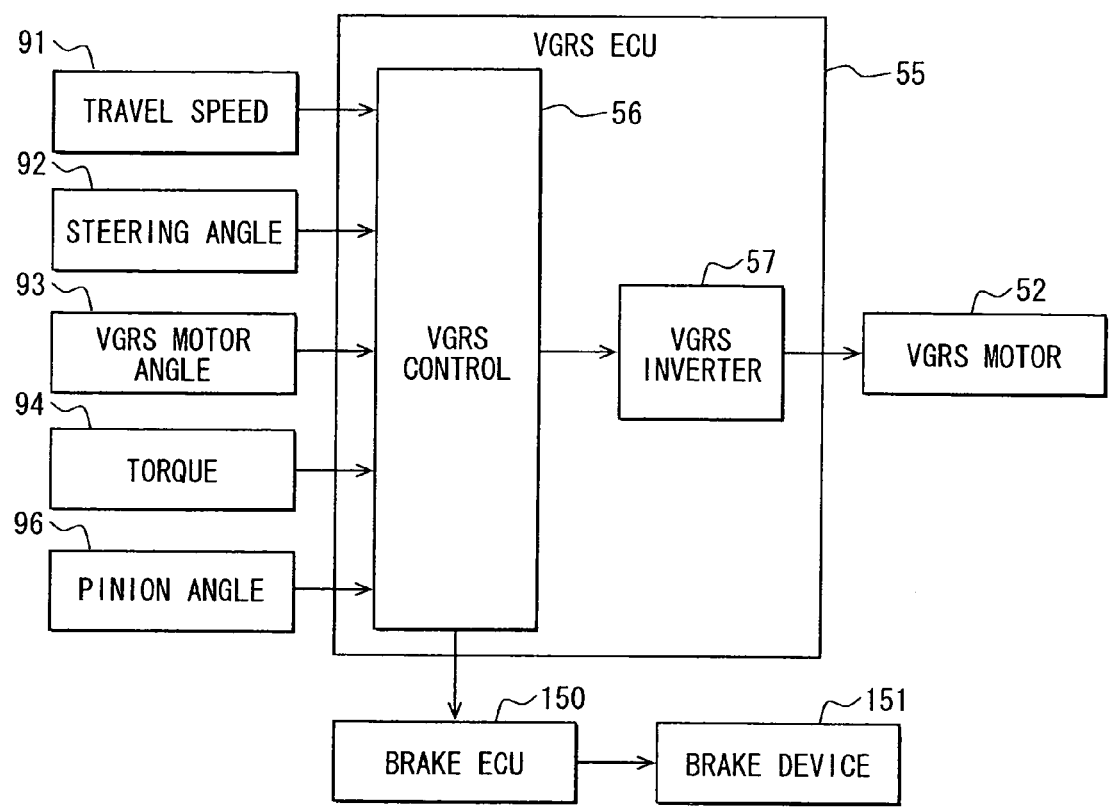
FIG. 24 is a block diagram showing a VGRS ECU provided in a steering control apparatus according to a second embodiment of the present invention.
Figure 25:
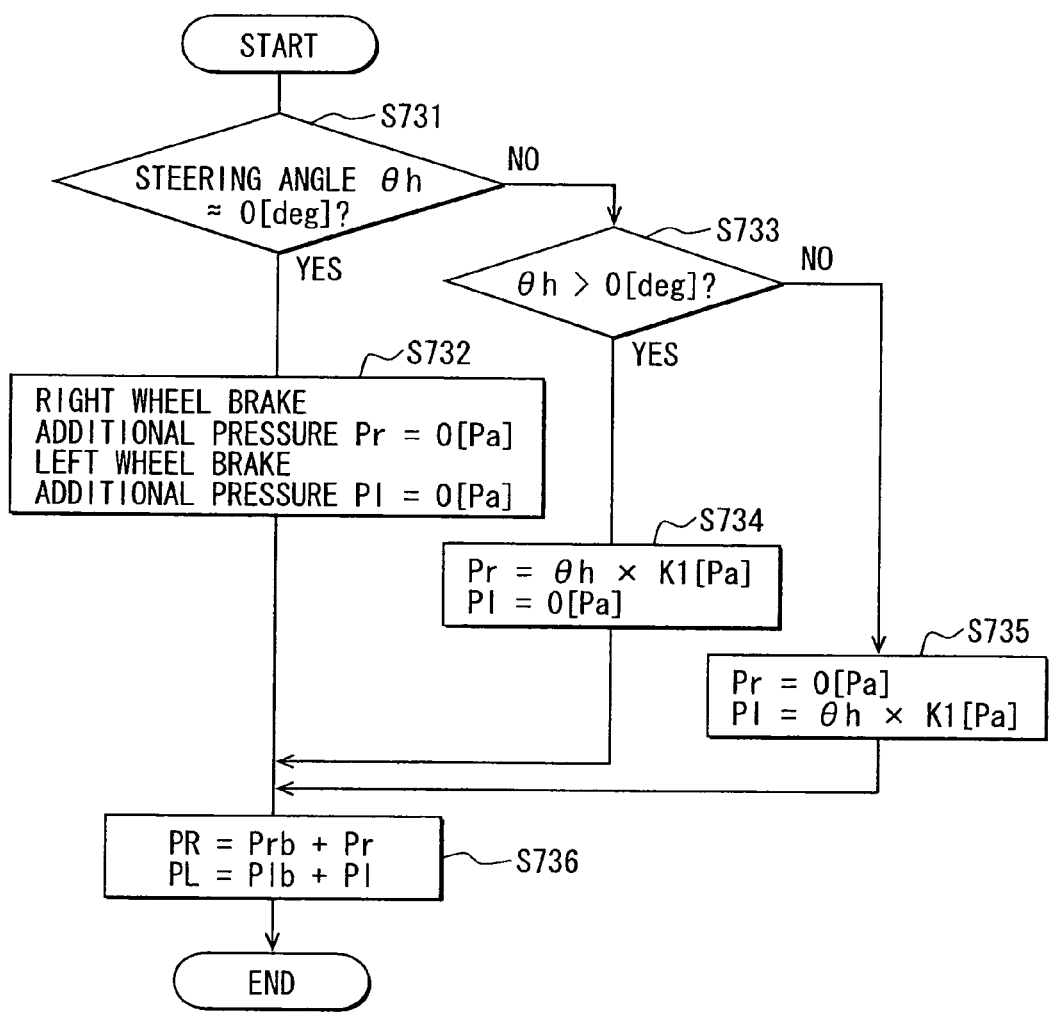
FIG. 25 is a flowchart showing idling suppression processing executed in the second embodiment.

A steering control apparatus according to a second embodiment of the present invention will be described next with reference to FIG. 24 and FIG. 25. The steering control apparatus according to the second embodiment is similar to that of the first embodiment except for configuration of the VGRS control part 56 and the idling suppression processing. Only the configuration of the VGRS control part 56 and the idling suppression processing will be described below. As shown in FIG. 24, the VGRS control part 56 is configured to be capable of transmitting a brake control signal to a brake ECU 150, which controls a brake device 151.

The idling suppression processing in the second embodiment will be described with reference to FIG. 25. The processing shown in FIG. 25 is executed at S700 in FIG. 16. At S731, it is checked whether the steering wheel angle θh is approximately 0. If it is determined that the steering wheel angle θh is not approximately 0 (S731:NO), S733 is executed. If it is determined that the steering wheel angle θh is approximately 0 (S731:YES), S732 is executed. At S732, a right vehicle wheel hydraulic brake additional pressure Pr and a left vehicle wheel hydraulic additional pressure Pl are both set to 0.

At S733, which is executed if the steering wheel angle θh is not approximately 0 (S731:NO), it is checked whether the steering wheel angle θh is positive.

Similarly to the first embodiment, the steering wheel angle θh is assumed to be positive and negative when the steering wheel 8 is turned in the clockwise direction and in the counter-clockwise direction, respectively. If it is determined that the steering wheel angle θh is negative (S733: NO), that is the steering wheel 8 is steered in the counter-clockwise direction, S735 is executed. If it is determined that the steering wheel angle θh is positive (S733:YES), that is the steering wheel 8 is steered in the clockwise direction, S734 is executed.

At S734, the right vehicle wheel brake additional hydraulic pressure Pr is calculated based on the steering wheel angle θh. The right vehicle wheel brake additional hydraulic pressure Pr is calculated by multiplying the steering wheel angle θh by a coefficient K1. The left vehicle wheel brake additional hydraulic pressure Pl is set to be 0. At S735, which is executed if the steering wheel angle θh is negative (S733: NO), the left vehicle wheel brake additional hydraulic pressure Pl is calculated based on the steering wheel angle θh. The left vehicle wheel brake additional hydraulic pressure Pl is calculated by multiplying the steering wheel angle θh by the coefficient K1. The right vehicle wheel brake additional hydraulic pressure Pr is set to be 0.

At S736, the right vehicle wheel brake hydraulic pressure PR and the left vehicle wheel brake hydraulic pressure PL are calculated. The right vehicle wheel brake hydraulic pressure PR is calculated by adding the right vehicle wheel brake additional hydraulic pressure Pr to a right vehicle wheel brake basic hydraulic pressure Prb. The left vehicle wheel brake hydraulic pressure PL is calculated by adding the left vehicle wheel brake additional hydraulic pressure Pl to a left vehicle wheel brake basic hydraulic pressure Plb. The right vehicle wheel brake basic hydraulic pressure Prb and the left vehicle wheel brake basic hydraulic pressure Plb are hydraulic pressures, which are generated when a brake pedal is pressed down by a driver or calculated based on a brake command signal corresponding to a press-down force applied to the brake pedal. Command signals indicating the right vehicle wheel brake hydraulic pressure PR and the left vehicle wheel brake hydraulic pressure PL, which are calculated as above, are transmitted to the brake ECU 150.

Thus, when the steering wheel 8 is steered in the clockwise direction, the right vehicle wheel brake additional hydraulic pressure Pr is applied additionally to the right vehicle wheels so that the right vehicle wheels rotate at lower speeds than the left vehicle wheels. As a result, torque is generated to turn the steering wheel 8 in the clockwise direction (self-steering condition due to difference in rotation speeds between the steered wheels 7 at the left side and the right side) and the vehicle is steered in the right direction. Similarly, when the steering wheel 8 is steered in the counter-clockwise direction, the left vehicle wheel brake additional hydraulic pressure Pl is applied additionally to the left vehicle wheels so that the left vehicle wheels rotate at lower speeds than the right vehicle wheels. As a result, torque is generated to turn the steering wheel 8 in the counter-clockwise direction (self-steering condition due to difference in rotation speeds between the steered wheels 7 at the left side and the right side) and the vehicle is steered in the left direction.

According to the second embodiment, turning force of the vehicle is generated by controlling the brake device 151 (braking) and as a result rotation torque is generated to turn the steering wheel 8 in a direction, which corresponds to the turn direction of the vehicle. This torque and self-aligning torque, which generates from a caster angle of a suspension and operates to return the steering wheel 8, cancel out each other. As a result, the torque, which tends to disable the self-lock operation, is reduced and hence idling of the steering wheel 8 is suppressed.

The VGRS control part 56 causes a difference in rotation speeds between the left vehicle wheel and the right vehicle wheels based on the steering wheel angle θh. As a result, the steering wheel 8 is suppressed from idling so that the vehicle may be turned in the same direction as the direction of steering of the steering wheel 8 and safety may be enhanced.

The VGRS control part 56 is configured to operate as an idling control part. Instead, the brake ECU 150 may be configured to operate as the idling control part, or both the VGRS control part 56 and the brake ECU 150 may be configured to operate jointly as the idling control part.

Third Embodiment

Figure 26:
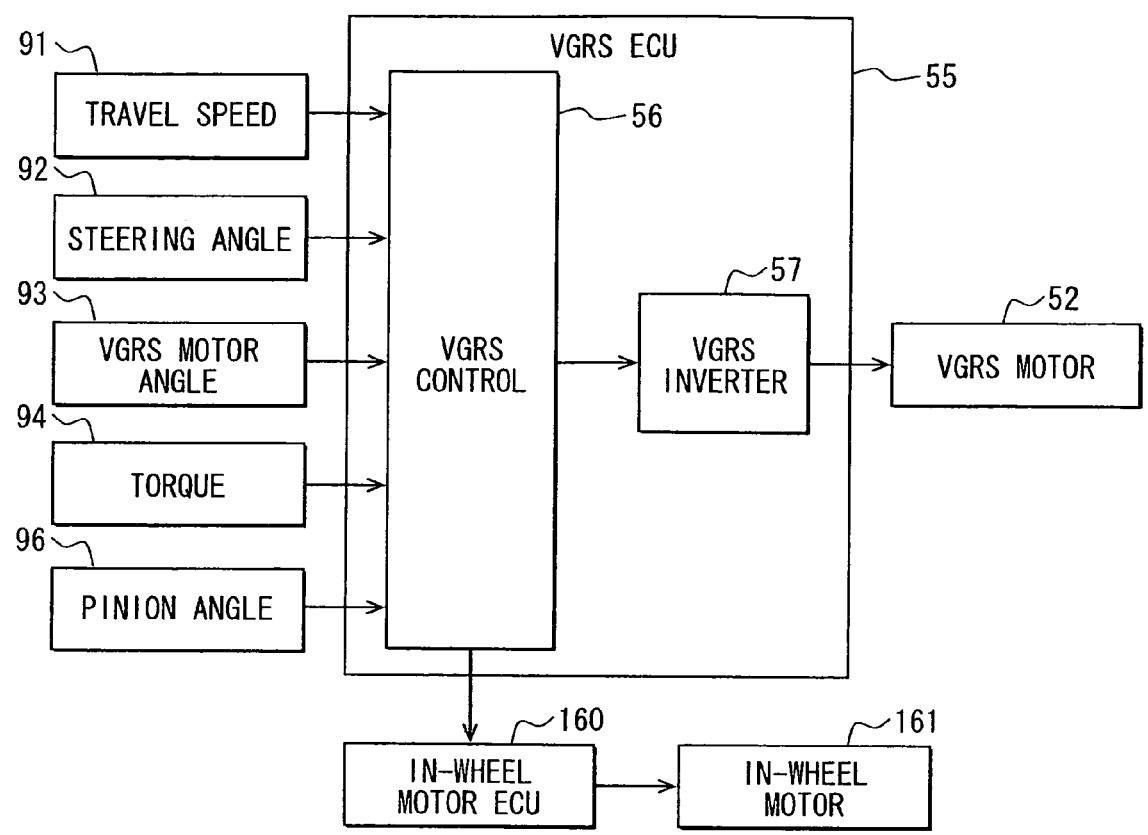
FIG. 26 is a block diagram showing a VGRS ECU provided in a steering control apparatus according to a third embodiment of the present invention.
Figure 27:
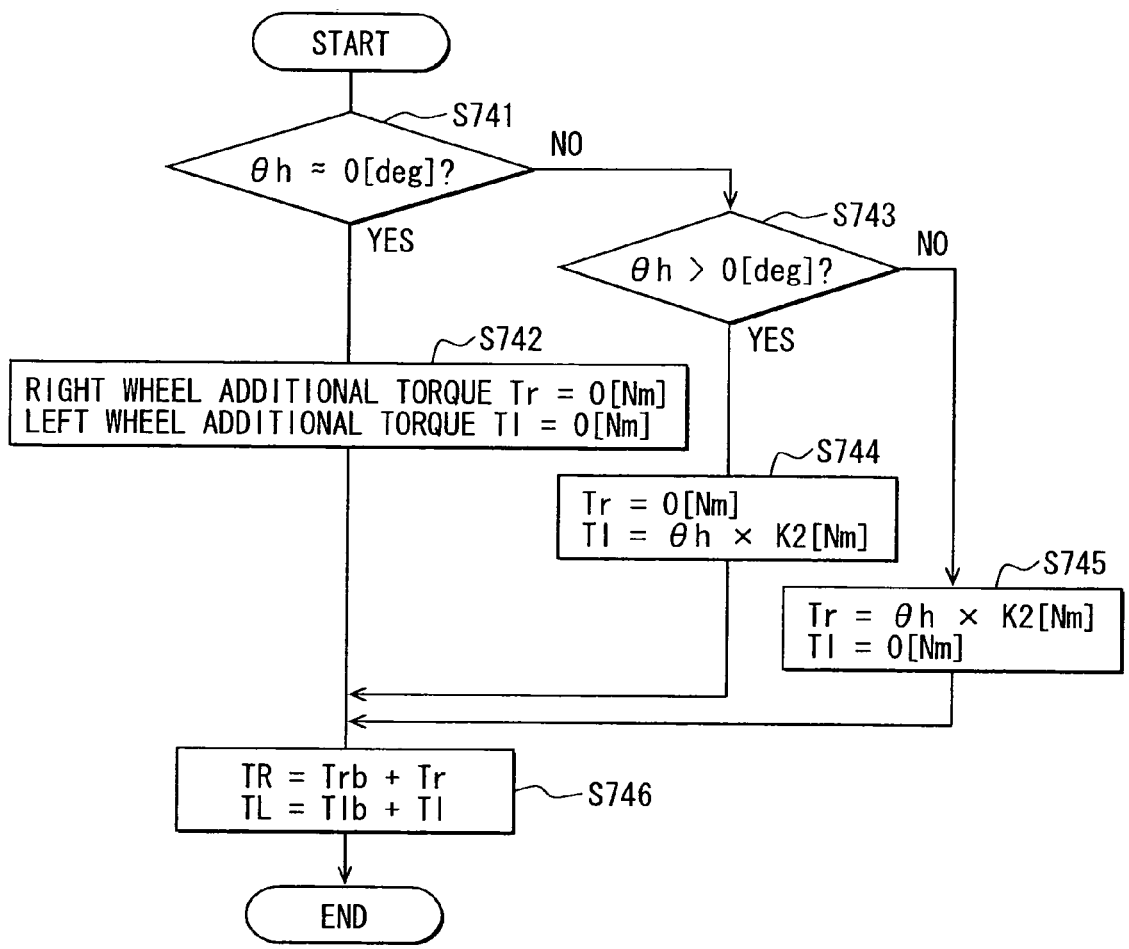
FIG. 27 is a flowchart showing idling suppression processing executed in the third embodiment.

A steering control apparatus according to a third embodiment of the present invention will be described with reference to FIG. 26 and FIG. 27. The steering control apparatus according to the third embodiment is similar to that of the first embodiment except for configuration of the VGRS control part 56 and the idling suppression processing. Only the configuration of the VGRS control part 56 and the idling suppression processing will be described below. As shown in FIG. 26, the VGRS control part 56 is configured to be capable of transmitting a drive control signal to an in-wheel motor ECU 161, which controls in-wheel motors mounted in each tire wheel.

The idling suppression processing according to the third embodiment will be described with reference to FIG. 27. The processing shown in FIG. 27 is executed at S700 in FIG. 16. At S741, it is checked whether the steering wheel angle θh is approximately 0. If it is determined that the steering wheel angle θh is not approximately 0 (S741:NO), S743 is executed. If it is determined that the steering wheel angle θh is approximately 0 (S741:YES), S742 is executed. At S742, a right vehicle wheel additional torque Tr and a left vehicle wheel additional torque Tl are both set to 0.

At S743, which is executed if the steering wheel angle θh is not approximately 0 (S741:NO), it is checked whether the steering wheel angle θh is positive. Similarly to the first embodiment, the steering wheel angle θh is assumed to be positive and negative when the steering wheel 8 is turned in the clockwise direction and in the counter-clockwise direction, respectively. When it is determined that the steering wheel angle θh is negative (S743:NO), that is, the steering wheel 8 is steered in the counter-clockwise direction, S745 is executed. When it is determined that the steering wheel angle θh is positive (S743:YES), that is, the steering wheel 8 is steered in the clockwise direction, S744 is executed.

At S744, the left vehicle wheel additional torque is calculated based on the steering wheel angle θh. The left vehicle wheel additional torque Tl is calculated by multiplying the steering wheel angle θh by a coefficient K2. The right vehicle wheel additional torque Tr is set to be 0. At S745, which is executed if the steering wheel angle θh is negative (S743: NO), the right vehicle wheel additional torque Tl is calculated by multiplying the steering wheel angle θh by the coefficient K2. The left vehicle wheel additional torque is set to be 0.

At S746, the right vehicle wheel torque TR and the left vehicle wheel torque TL are calculated. The right vehicle wheel torque TR is calculated by adding the right vehicle wheel additional torque Tr to a right vehicle wheel basic torque Trb. The left vehicle wheel torque TL is calculated by adding the left vehicle wheel additional torque Tl to a left vehicle wheel basic torque Tlb. The right vehicle wheel, basic torque Trb and the left vehicle wheel basic torque Tlb are torques calculated based on an accelerator command signal corresponding to a press-down force applied to an accelerator pedal. Command signals indicating the right vehicle wheel torque TR and the left vehicle wheel torque TL, which are calculated as above, are transmitted to the in-wheel motor ECU 160.

Thus, when the steering wheel 8 is steered in the clockwise direction, the left vehicle wheel additional torque is applied additionally to the left vehicle wheels so that the left vehicle wheels rotate at higher speeds than the right vehicle wheels. As a result, torque is generated to turn the steering wheel 8 in the clockwise direction (self-steering condition due to difference in rotation speeds between the steered wheels 7 at the left side and the right side) and the vehicle is steered in the right direction. Similarly, when the steering wheel 8 is steered in the counter-clockwise direction, the right vehicle wheel additional torque is applied additionally to the right vehicle wheels so that the right vehicle wheels rotate at higher speeds than the left vehicle wheels. As a result, torque is generated to turn the steering wheel 8 in the counter-clockwise direction (self-steering condition due to difference in rotation speeds between the steered wheels 7 at the left side and the right side) and the vehicle is steered in the left direction.

According to the third embodiment, turning force of the vehicle is generated by controlling the in-wheel motors 161 and as a result rotation torque is generated to turn the steering wheel 8 in a direction, which corresponds to the turn direction of the vehicle. This torque and self-aligning torque, which generates from a caster angle of a suspension and operates to return the steering wheel 8, cancel out each other. As a result, the torque, which tends to disable the self-lock operation, is reduced and hence idling of the steering wheel 8 is suppressed.

The VGRS control part 56 causes a difference in rotation speeds between the left vehicle wheels and the right vehicle wheels based on the steering wheel angle θh. As a result, the steering wheel 8 is suppressed from idling so that the vehicle may be turned in the same direction as the direction of steering of the steering wheel 8 and safety may be enhanced.

The VGRS control part 56 is configured to operate as an idling control part. Instead, the brake ECU 150 may be configured to operate as the idling control part, or both the VGRS control part 56 and the brake ECU 150 may be configured to operate jointly as the idling control part.

(Modifications)

In the first to the third embodiments, the VGRS part and the EPS part are integrated into a single module and provided on the column shaft 2. However, the VGRS part and the EPS part need not be integrated into a single module. It is possible to provide the VGRS part on the column shaft 2 and the EPS part on the rack shaft separately form the VGRS part. The power steering system is not limited to be driven electrically but may be driven hydraulically.

In the first to the third embodiments, the VGRS ECU 55 and the EPS ECU 85 are provided separately. However, one ECU may be configured to control both the VGRS part and the EPS part.

In the first to the third embodiments, the VGRS part is controlled by calculating the VGRS motor voltage command value based on the VGRS motor rotation angle. It is however possible to control the VGRS part based on the pinion angle detected by the pinion angle sensor in place of the rotation angle of the VGRS motor.

In the steering control apparatus according to the first to the third embodiments, the rack-and-pinion mechanism 6 is provided at a more rear side of the vehicle from the straight line L, which is on the centers of rotation of the left and right vehicle wheels 7. The steering control apparatus may be modified as shown in FIG. 28.

Figure 28:
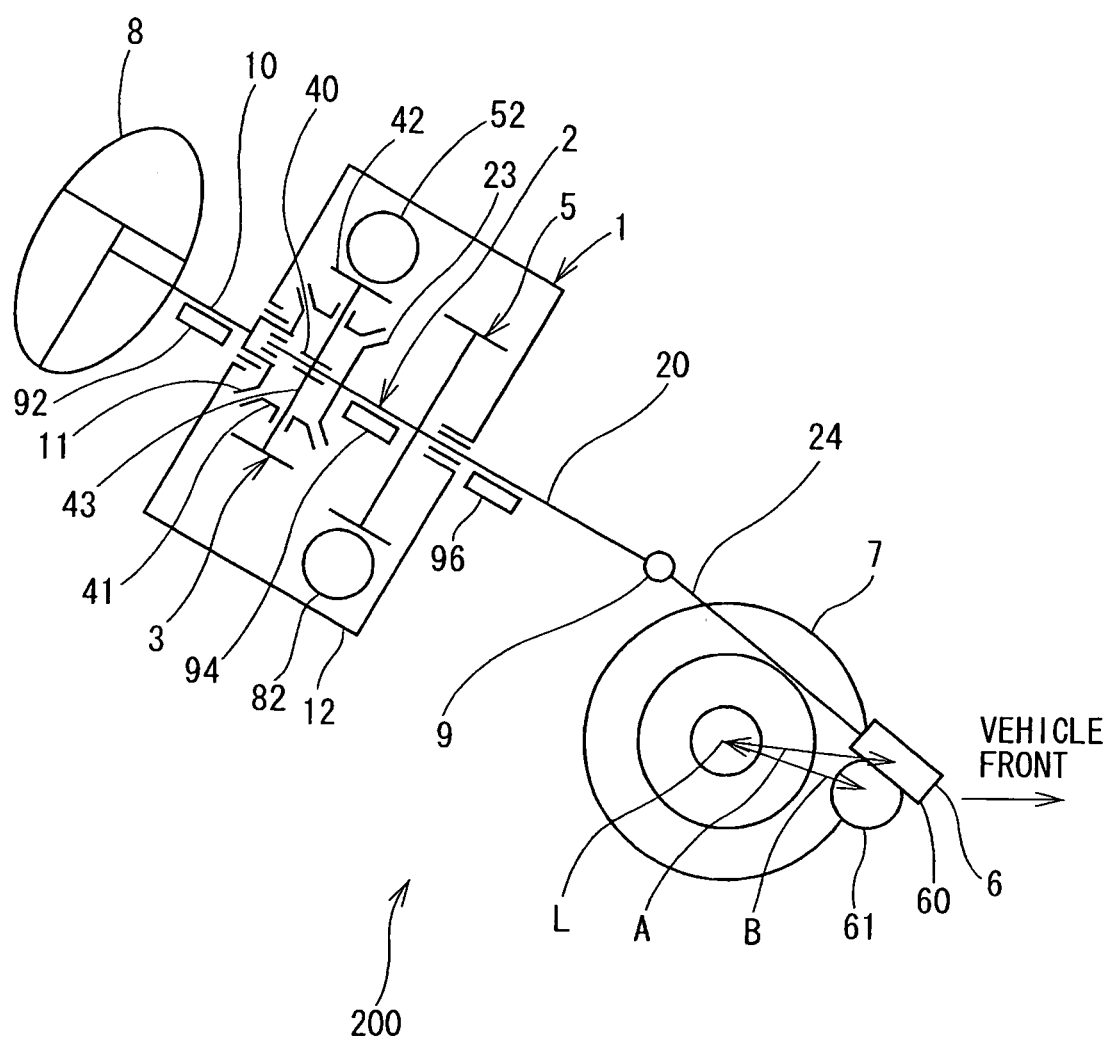
FIG. 28 is a schematic view showing a steering control apparatus according to one modification of the first to the third embodiments.

As shown in FIG. 28, a steering system 200 may be configured to have the rack-and-pinion mechanism 6 at a more front side of the vehicle than the straight line L, which is on the centers of rotation of the left and right vehicle wheels 7. The distance A between the steering pinion 60 and the straight line L connecting the centers of rotation of the right and left vehicle wheels 7 is set to be longer than the distance B between the steering rack bar 61 and the straight line L connecting the centers of rotation of the right and left vehicle wheels 7.

The output shaft 20 rotates in the direction opposite from that of the input shaft 10 by the operation of the differential gear provided between the input shaft 10 and the output shaft 20. When the steering wheel 8 is turned in the counter-clockwise direction, the steering pinion 60 rotates in the clockwise direction and the steering rack bar 61 moves in the left direction when viewed from the universal joint 9 side. As a result, the steered angle of the steered tire wheels 7 is changed so that the vehicle turns in the left direction. When the steering wheel 8 is turned in the clockwise direction, the steering pinion 60 rotates in the counter-clockwise direction and the steering rack bar 61 moves in the right direction when viewed from the universal joint 9 side. As a result, the steered angle of the steered tire wheels 7 is changed so that the vehicle turns in the right direction.

Thus, by setting the distances A and B to satisfy A>B, that is, the distance A between the steering pinion 60 and the straight line L connecting the centers of rotation of the steered wheels 7 is longer than the distance B between the steering rack bar 61 and the straight line L, the steered wheels 7 are steered in the direction opposite from the direction of rotation of the output shaft 20, the shaft 24 and the steering pinion 60. Thus, the direction of rotation of the steering wheel 8 and the direction of the steered wheels 7 are matched.

According to the first to the third embodiments, the worm wheel 50 is configured to have the tooth trace, which is inclined relative to the axis of rotation of the worm wheel 50. However, it is possible that the worm wheel is configured to have a tooth trace, which is not inclined relative to the axis of rotation of the worm wheel, as exemplarily shown in FIG. 29 to FIG. 32.

Figure 4:
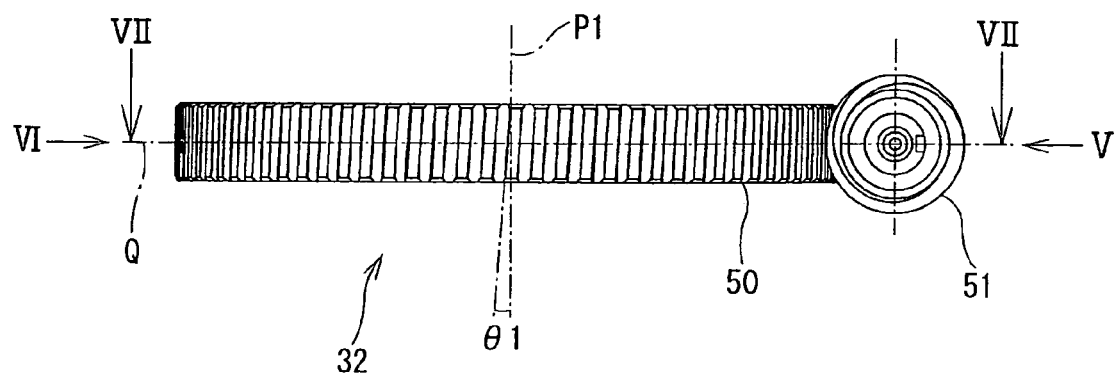
FIG. 4 is a side view of a worm gear provided in the steering control apparatus according to the first embodiment.
Figure 5:
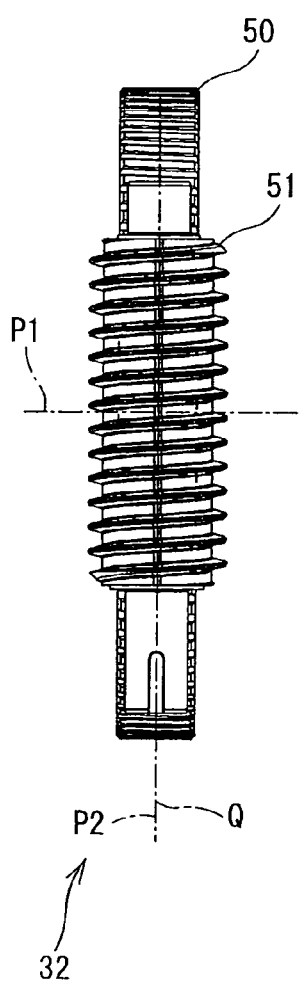
FIG. 5 is a side view of the worm gear viewed in a direction V in FIG. 4.
Figure 6:
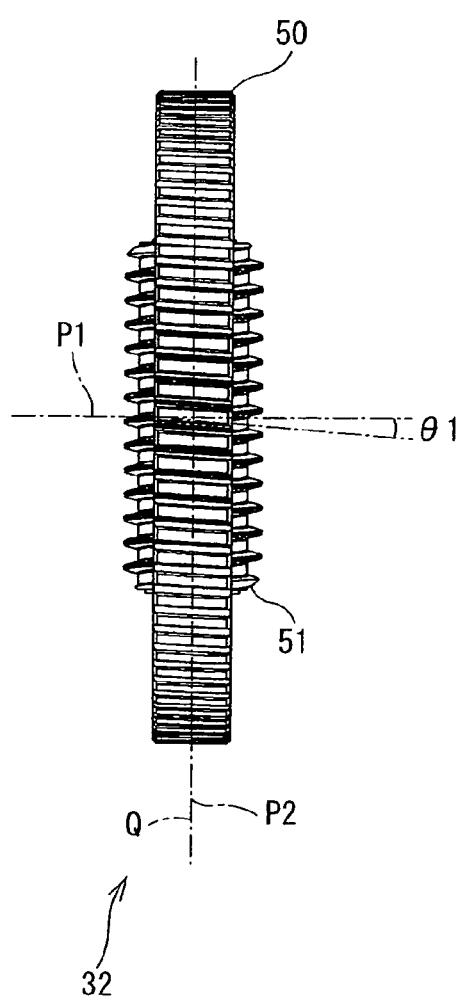
FIG. 6 is a side view of the worm gear viewed in a direction VI in FIG. 4.
Figure 7:
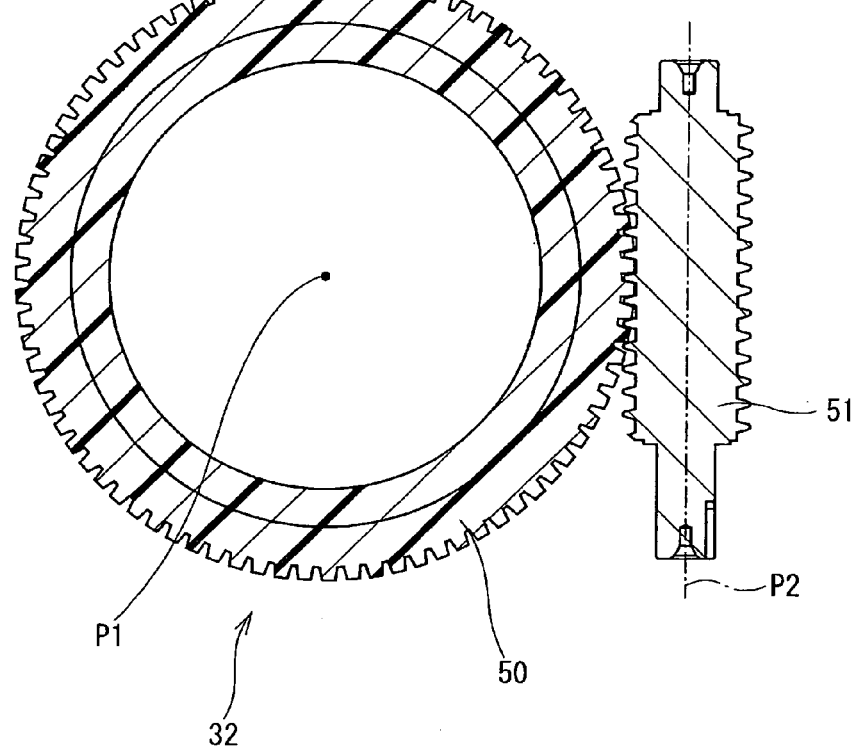
FIG. 7 is a sectional view of the worm gear taken along a line VII-VII in FIG. 4.
Figure 29:
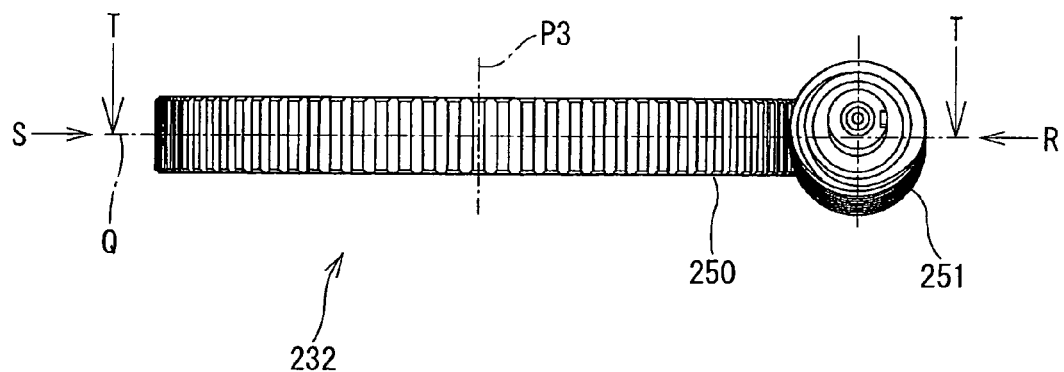
FIG. 29 is a side view of a worm gear provided as another modification in the steering control apparatuses according to the first to the third embodiments.
Figure 30:
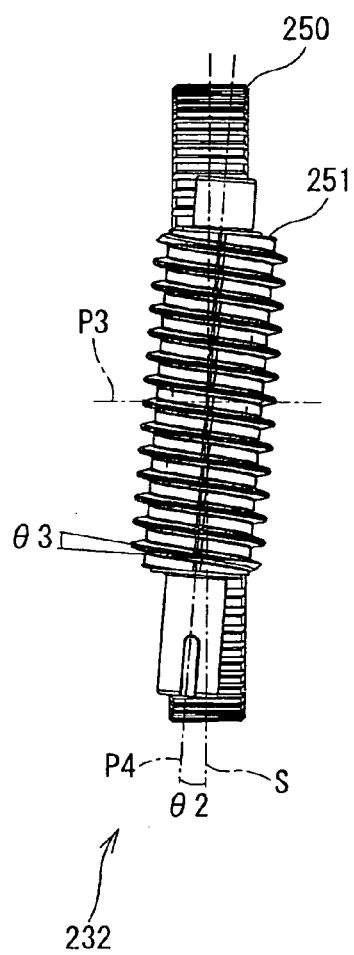
FIG. 30 is a side view of the worm gear viewed in a direction R in FIG. 29.
Figure 31:
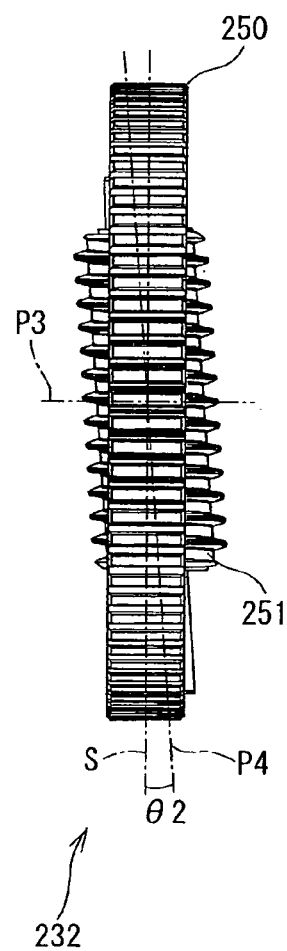
FIG. 31 is a side view of the worm gear viewed in a direction S in FIG. 29.
Figure 32:
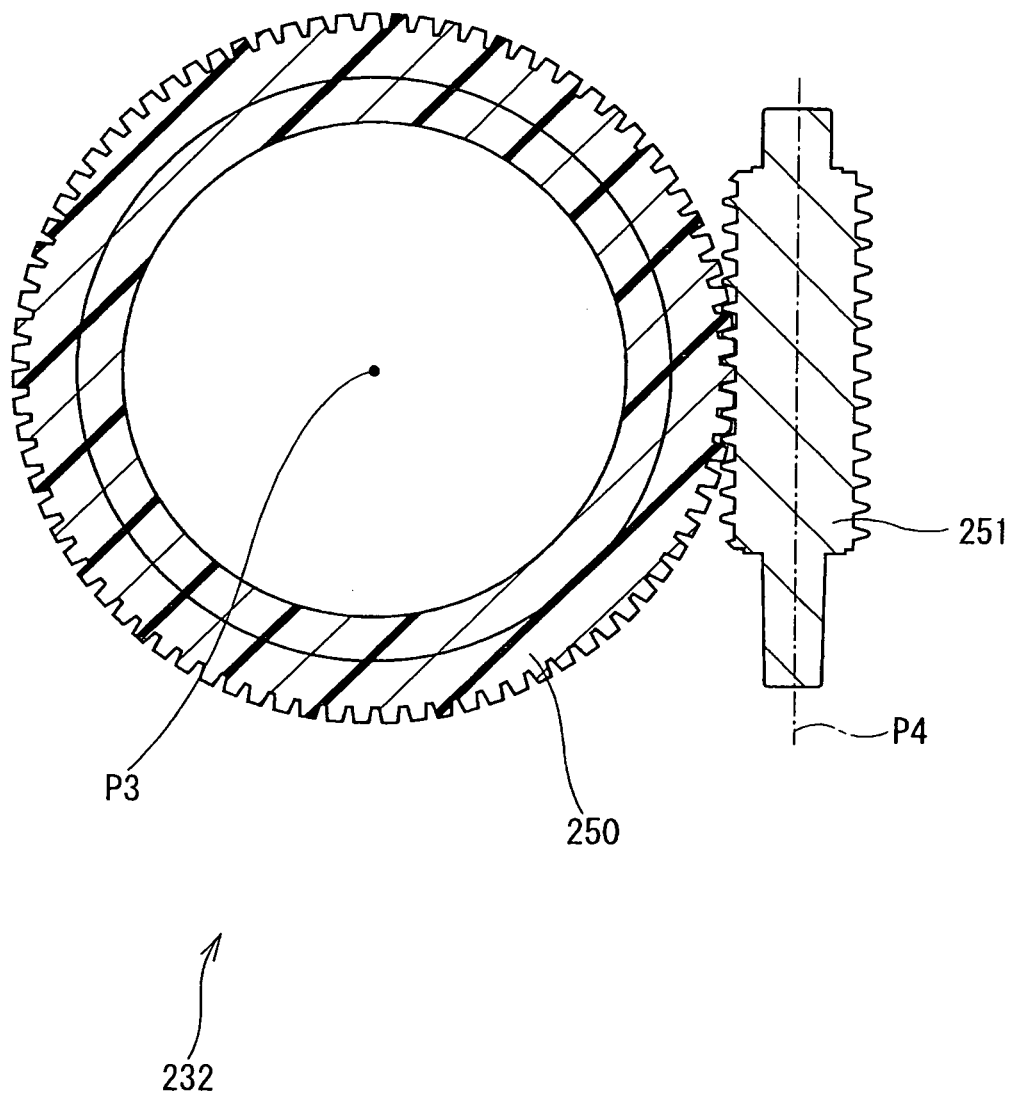
FIG. 32 is a sectional view of the worm gear taken along a line T-T in FIG. 29.

FIG. 29 shows a worm gear 232 in correspondence to FIG. 4. FIG. 30 shows the worm gear 232 viewed in a direction R in FIG. 29. FIG. 31 shows the worm gear 232 viewed in a direction S in FIG. 29. FIG. 32 shows the worm gear 232 in section taken along a line TT in FIG. 29. In this example, a worm wheel 250 and a worm 251 of the worm gear 232 are arranged such that a plane Q perpendicular to a rotation axis P3 of the worm wheel 250 and a rotation axis P4 of the worm 251 are inclined to form an inclination angle θ2. This inclination angle θ2 is substantially the same as a lead angle θ3 of the worm 251. By setting the lead angle θ3 to an angle, which enables self-locking operation, the same advantages are provided as in the first to the third embodiments.

In this example, the tooth traces of the worm wheel 250 are formed to be in parallel to the rotation axis P3 of the worm wheel 250. As a result, contact surfaces between the teeth of the worm wheel 250 and the teeth of the worm 251 are parallel to the rotation axis P3 of the worm wheel 250. Thus, when motive power is transferred from the worm 251 to the worm wheel 250, the worm wheel 250 is protected from generation of thrust load and position of engagement between the worm 251 and the worm wheel 250 is maintained surely.

In case that the worm wheel 250 is formed of resin, a drawing die is formed cylindrically and cutting blades are provided on a radially inside part of the drawing die. The drawing die is moved in the direction of rotation axis P3, thereby readily forming the worm wheel 250. Thus, blade-cutting process for separately forming the teeth of the worm wheel 250 is eliminated and manufacturing cost is reduced.

The present invention is not limited to the foregoing embodiments and modifications, but may be implemented in other different embodiments.

What is claimed is:

1. A steering control apparatus comprising:
   an input shaft coupled to a steering device operated by a driver of a vehicle;
   an output shaft provided rotatably to the input shaft and forming a torque transfer path to transfer torque applied to the steering device to vehicle wheels;
   a differential gear including an input gear rotatable with the input shaft, an output gear rotatable with the output shaft, and a pinion gear meshed with the input gear and the output gear;
   a support member provided to support the pinion gear rotatably;
   a worm gear including a worm wheel rotatable with the support member and a worm meshed with the worm wheel, the worm gear having a lead angle for providing a self-lock function, by which the worm wheel is enabled to rotate by rotation of the worm and the worm is disabled to rotate by rotation of the worm wheel;
   a motor provided to drive the worm to rotate;
   a steering angle acquisition part for acquiring a steering angle of the steering device;
   a motor drive control part for controlling driving of the motor based on the steering angle of the steering device acquired by the steering angle acquisition part;
   a self-lock failure check part for checking whether the worm gear has a self-lock failure, which disables self-lock operation in the worm gear; and
   an idling suppression part for suppressing the steering device from idling when the self-lock failure is determined by the self-lock failure check part.

2. The steering control apparatus according to claim 1, further comprising:
   a motor rotation angle acquisition part for acquiring a rotation angle of the motor,
   wherein the self-lock failure check part determines the that the worm gear has the self-lock failure, when energization of the motor is turned off and the rotation angle of the motor is different from 0.

3. The steering control apparatus according to claim 1, wherein:
   the self-lock failure check part determines that the worm gear has the self-lock failure, when a rotation angle command value for the motor is approximately 0 and a voltage command value for the motor is different from 0.

4. The steering control apparatus according to claim 1 further comprising:
   an output shaft rotation angle acquisition part for acquiring a rotation angle of the output shaft,
   wherein the self-lock failure check part determines the that the worm gear has the self-lock failure, when the rotation angle of the output shaft acquired by the output shaft rotation angle acquisition part is different from a set rotation angle indicating a rotation angle of the output shaft, which is calculated based on the steering angle and a speed increase ratio between the steering angle of the steering device and the rotation angle of the output shaft.

5. The steering control apparatus according to claim 1 further comprising:
   a rotation check part for checking whether the input shaft is in rotation; and
   a steering torque acquisition part for acquiring a steering torque generated by steering operation on the steering wheel,
   wherein the self-lock failure check part determines the that the worm gear has the self-lock failure, when the input shaft is determined to be in rotation by the rotation check part and steering torque acquired by the steering torque acquisition part is approximately 0.

6. The steering control apparatus according to claim 1 further comprising:
   a straight travel check part for checking whether the vehicle is traveling in a straight direction,
   wherein the self-lock failure check part determines the that the worm gear has the self-lock failure, when the vehicle is determined to be traveling in the straight direction and the steering angle acquired by the steering angle acquisition part is different from 0.

7. The steering control apparatus according to claim 1, further comprising:
   an inverter part for switching over currents supplied to coils of the motor, the inverter part including a plurality of switching elements forming a plurality of switching element pairs by high-side switching elements provided at a high-potential side and low-side switching elements provided at a low-potential side,
   wherein the idling suppression part turns on all the high-side switching elements or all the low-side switching elements to suppress idling of the steering wheel.

8. The steering control apparatus according to claim 1, wherein:
   the idling suppression part controls driving of the motor such that cancel torque is applied to the worm to cancel out torque, which is generated by rotation of the worm wheel and applied to the worm.

9. The steering control apparatus according to claim 1, wherein:
   the idling suppression part causes a difference in rotation speeds between a left tire wheel and a right tire wheel of the vehicle based on the steering angle acquired by the steering angle acquisition part.

10. The steering control apparatus according to claim 1, wherein:
    the worm wheel is formed to have tooth traces, which are inclined by the lead angle relative to a rotation axis of the worm wheel, which is perpendicular to a rotation axis of the worm.

11. The steering control apparatus according to claim 1, wherein:
    the worm wheel is formed to have tooth traces, which are parallel to a rotation axis of the worm wheel; and
    the worm is formed to have tooth traces, which are included by the lead angle relative to a rotation axis of the worm, and is meshed with the worm wheel such that the rotation axis of the worm is inclined by the lead angle relative to a plane perpendicular to the rotation axis of the worm wheel.

* * * * *